(12) United States Patent
Debro

(10) Patent No.: US 11,530,138 B1
(45) Date of Patent: *Dec. 20, 2022

(54) WASTEWATER SPRAY DISTRIBUTION APPARATUS

(71) Applicant: Spray Heads, LLC, Alliance, OH (US)

(72) Inventor: Israel Michael Debro, Alliance, OH (US)

(73) Assignee: SPRAY HEADS, LLC, Alliance, OH (US)

( * ) Notice: Subject to any disclaimer, the term of this patent is extended or adjusted under 35 U.S.C. 154(b) by 699 days.

This patent is subject to a terminal disclaimer.

(21) Appl. No.: 16/535,300

(22) Filed: Aug. 8, 2019

Related U.S. Application Data

(60) Provisional application No. 62/717,413, filed on Aug. 10, 2018.

(51) Int. Cl.
*C02F 1/00* (2006.01)
*B05B 3/04* (2006.01)

(52) U.S. Cl.
CPC ............ *C02F 1/006* (2013.01); *B05B 3/0459* (2013.01); *C02F 2201/005* (2013.01); *C02F 2301/08* (2013.01)

(58) Field of Classification Search
None
See application file for complete search history.

(56) References Cited

U.S. PATENT DOCUMENTS

| | | | |
|---|---|---|---|
| 3,066,871 A | 12/1962 | Bom |
| 3,409,030 A | 11/1968 | Schmidt |
| 3,592,388 A | 7/1971 | Friedlander |
| 4,828,179 A | 5/1989 | Garner |
| 4,842,201 A | 6/1989 | Hunter |
| 5,190,644 A | 3/1993 | Wisniewski |
| 5,497,799 A | 3/1996 | Shenk |
| 5,954,271 A | 9/1999 | Le |
| 6,422,480 B1 | 7/2002 | Richmond |
| 7,226,003 B2 | 6/2007 | Kah, Jr. et al. |

*Primary Examiner* — Richard C Gurtowski
(74) *Attorney, Agent, or Firm* — Ralph E. Jocke; Walker & Jocke

(57) ABSTRACT

A wastewater spray distribution apparatus is operative to distribute wastewater produced by a sewage treatment system (10) onto a ground level (22) through operation of sprayers (118, 260). The exemplary sprayers include a manifold (142, 262) that includes outlet nozzles (158, 264) that can be readily removed and replaced. The exemplary manifold further includes interior areas bounded by surfaces that slope continuously downward from the outlet nozzles to the manifold inlet to assure the draining of water therefrom. Each of the nozzles include a base (140) which includes a liquid tight jacket (208). The jacket isolates components which facilitate movement of a rotatable hub (154), from water passing through the sprayer and other contaminants. A brake is provided in each nozzle and includes a liquid lubricant in the jacket that operates to limit rotational movement produced by the thrust of water passing from the outlet nozzles to assure that the sprayer operates at the appropriate rotational speed.

28 Claims, 35 Drawing Sheets

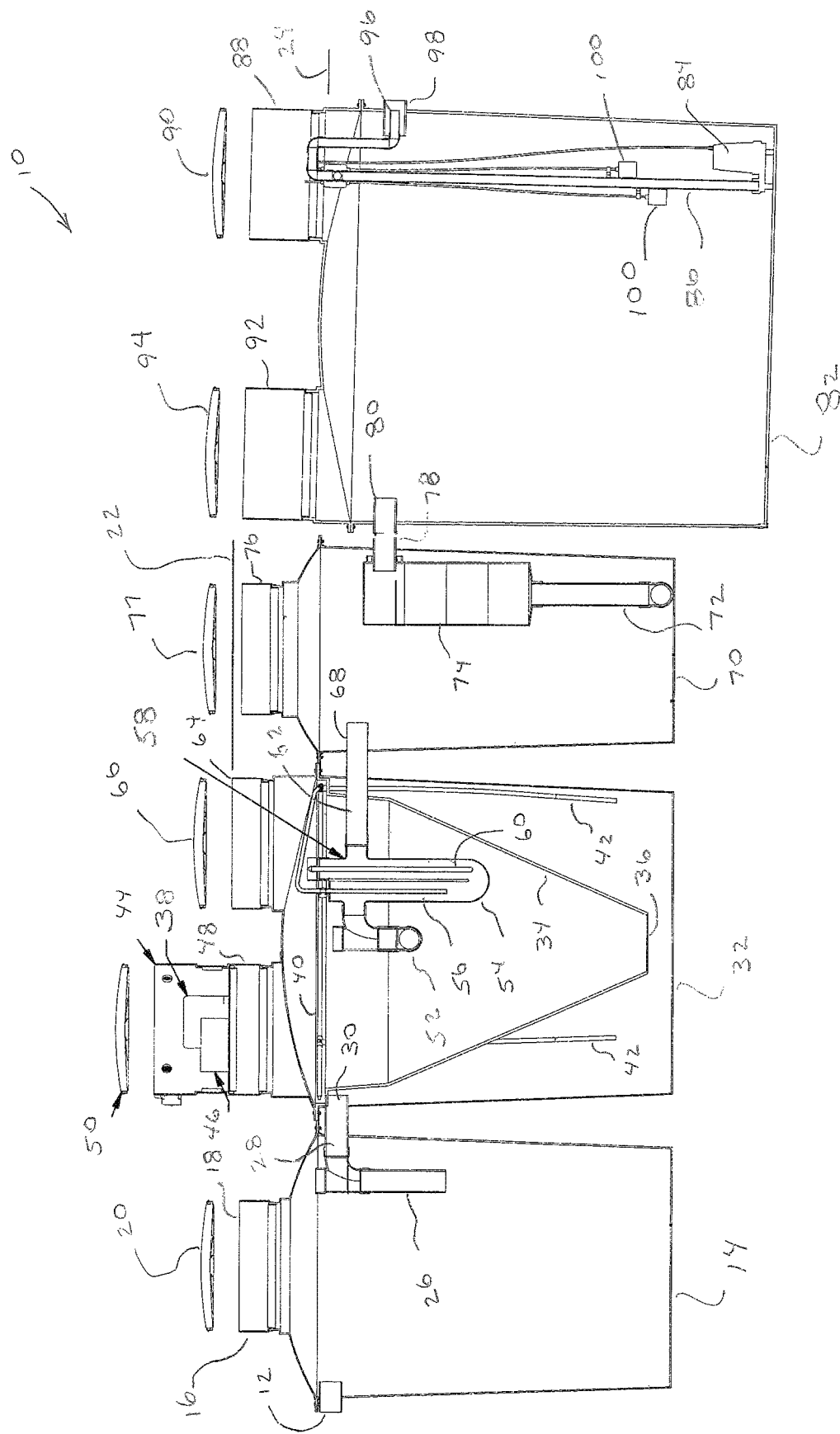

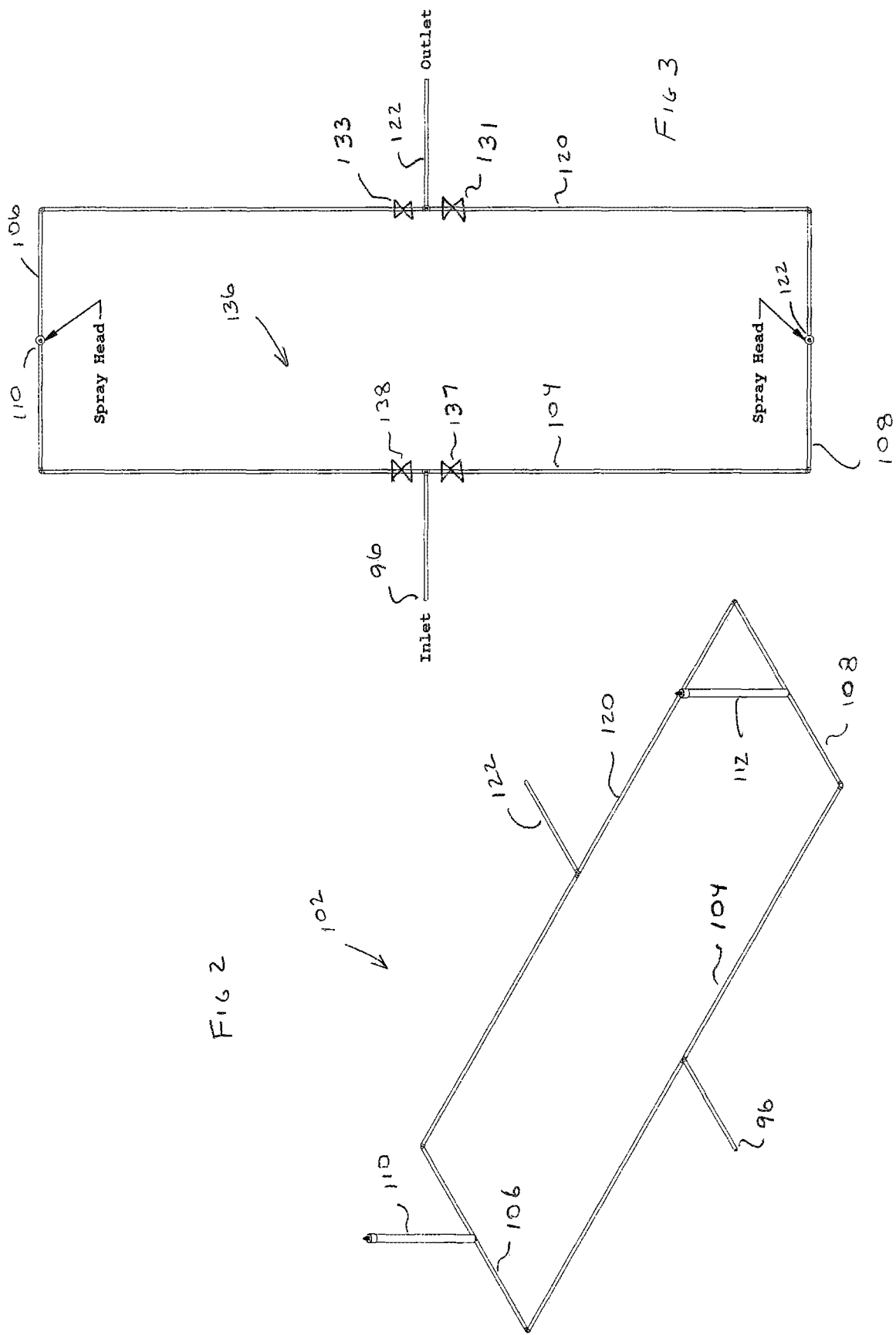

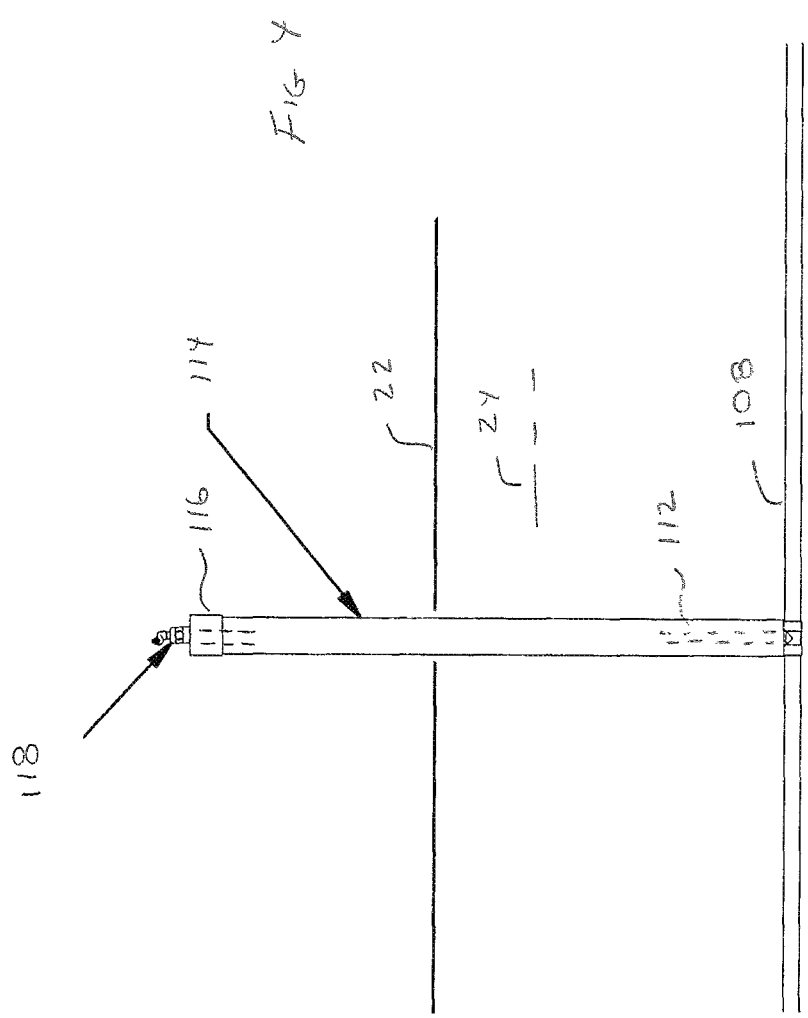

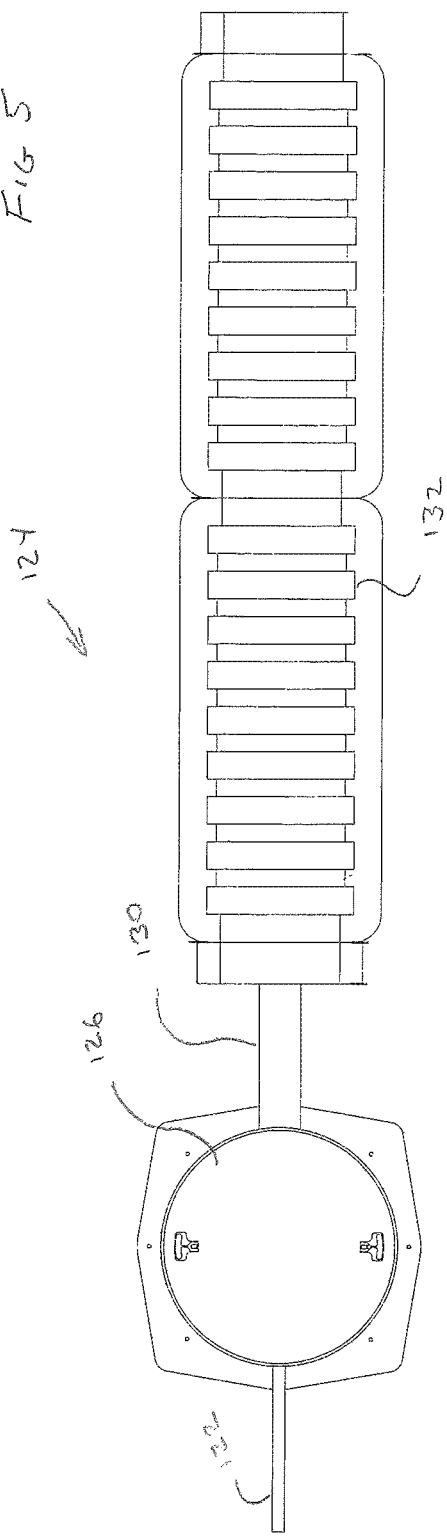
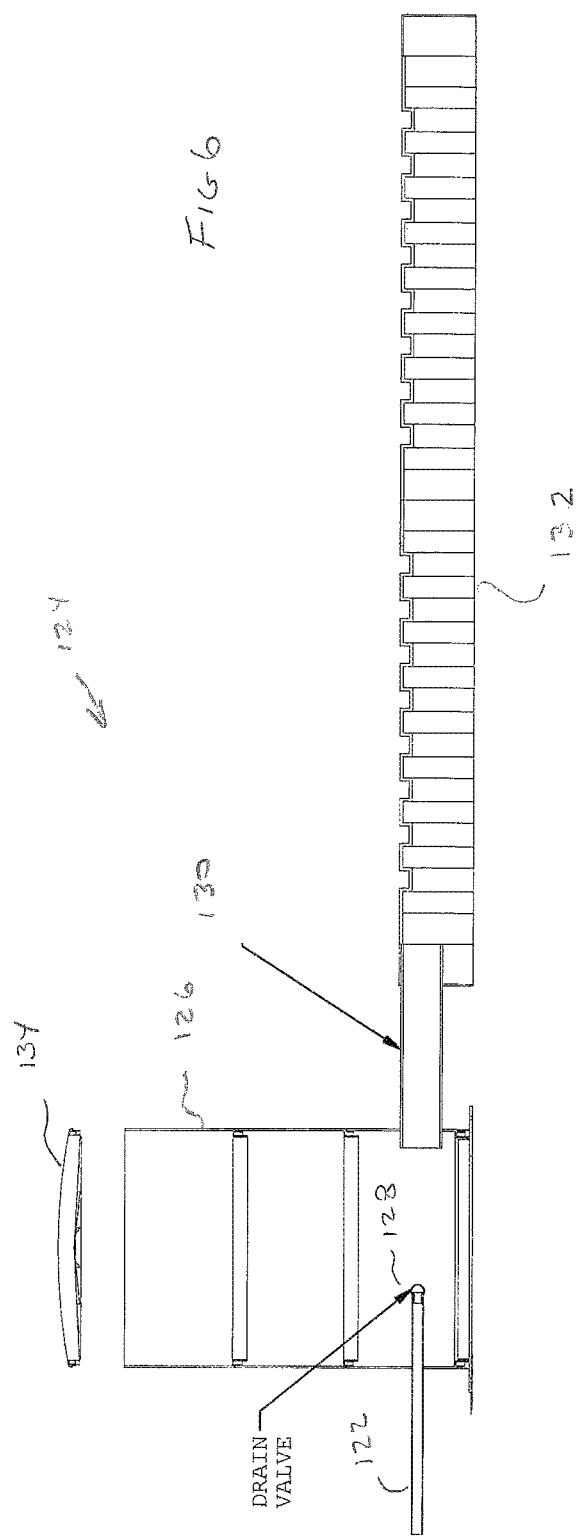

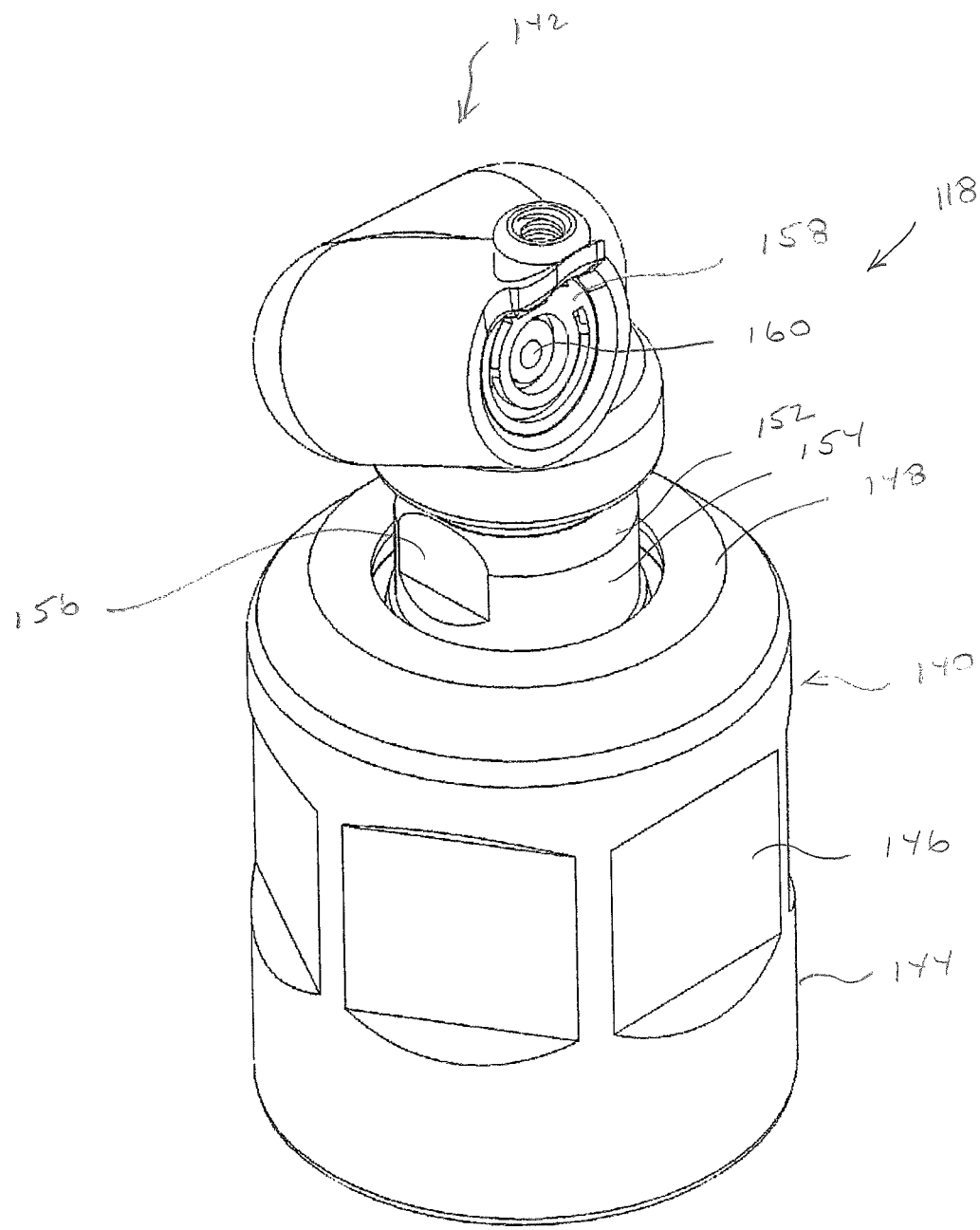

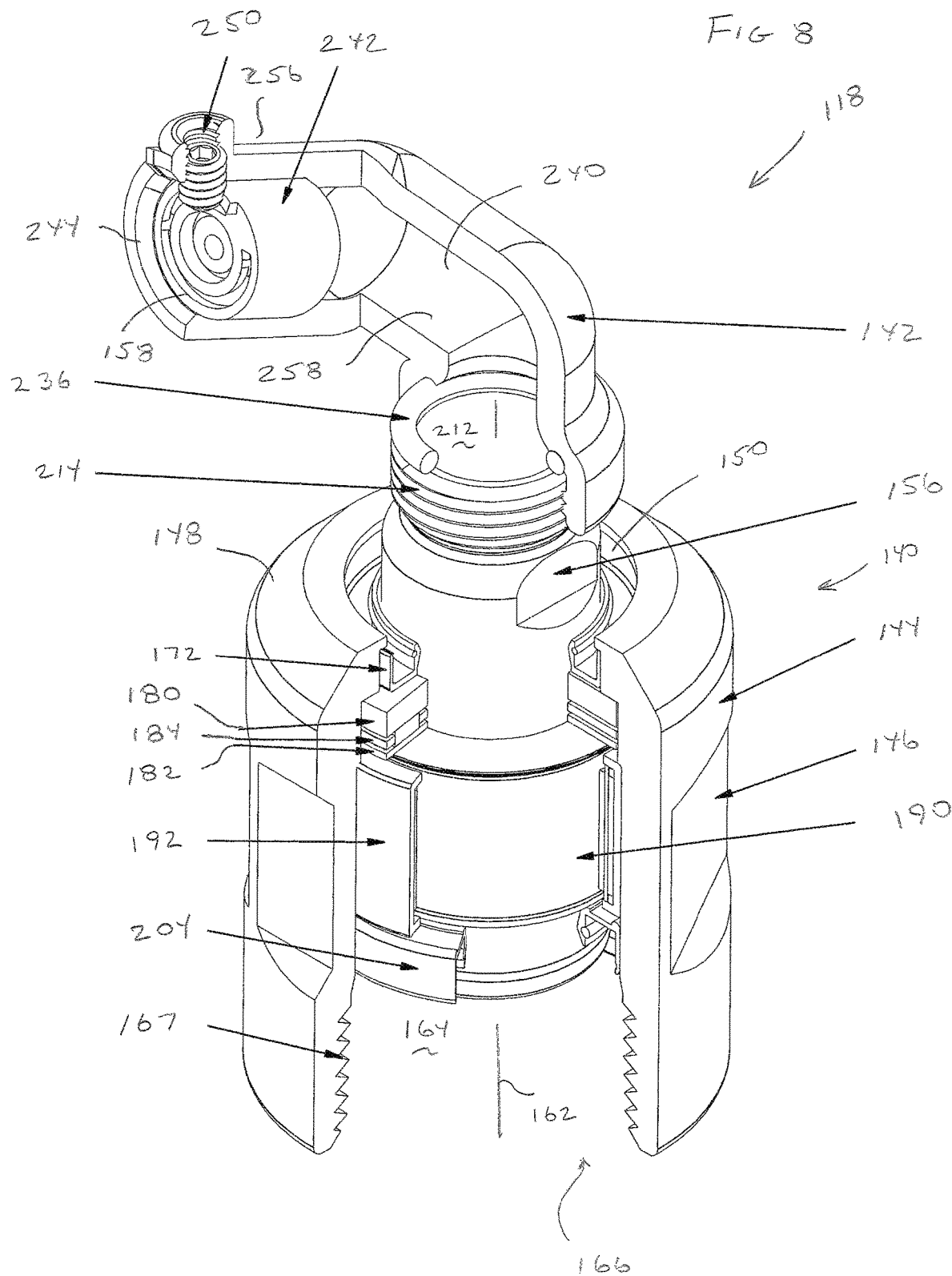

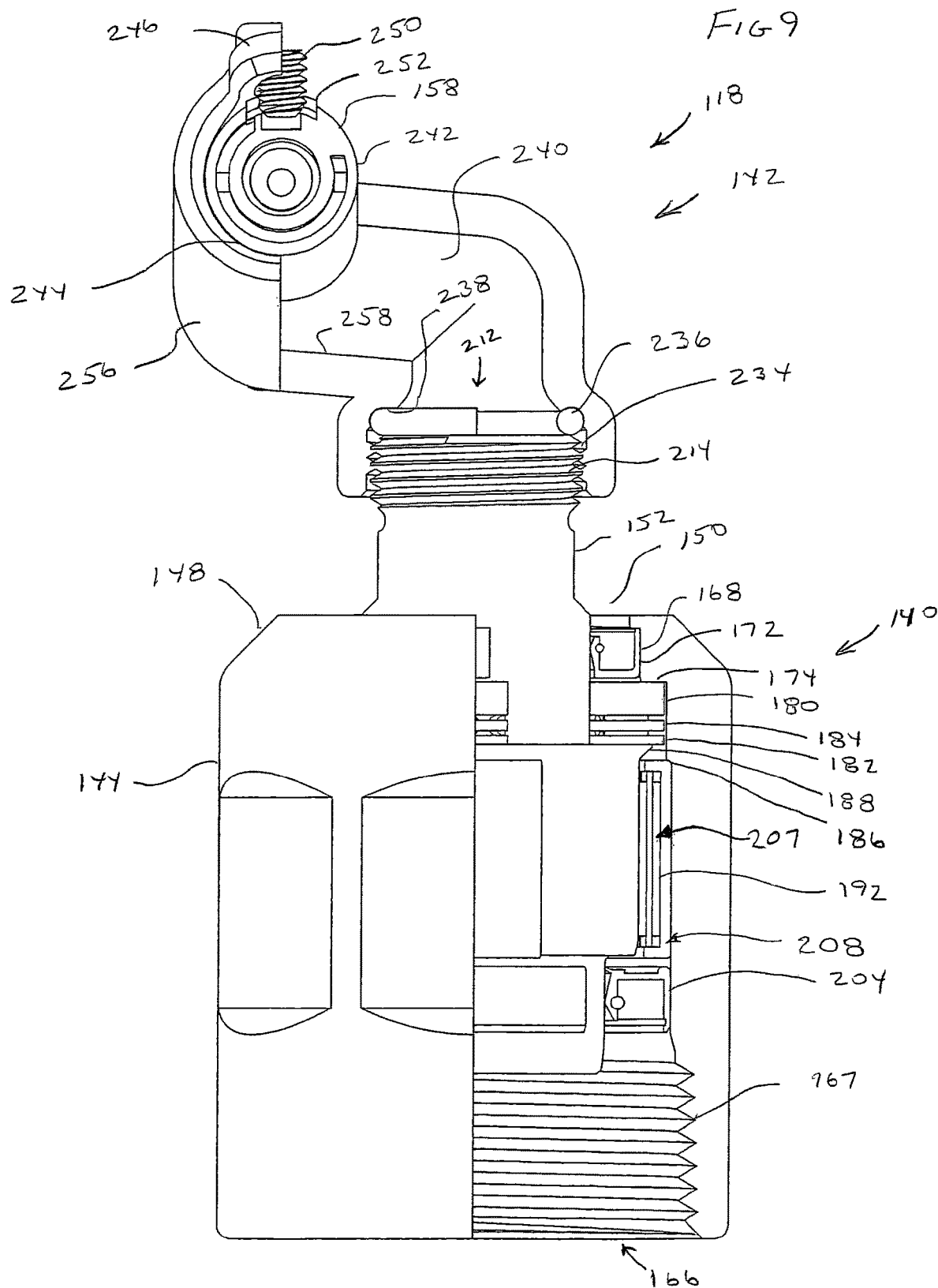

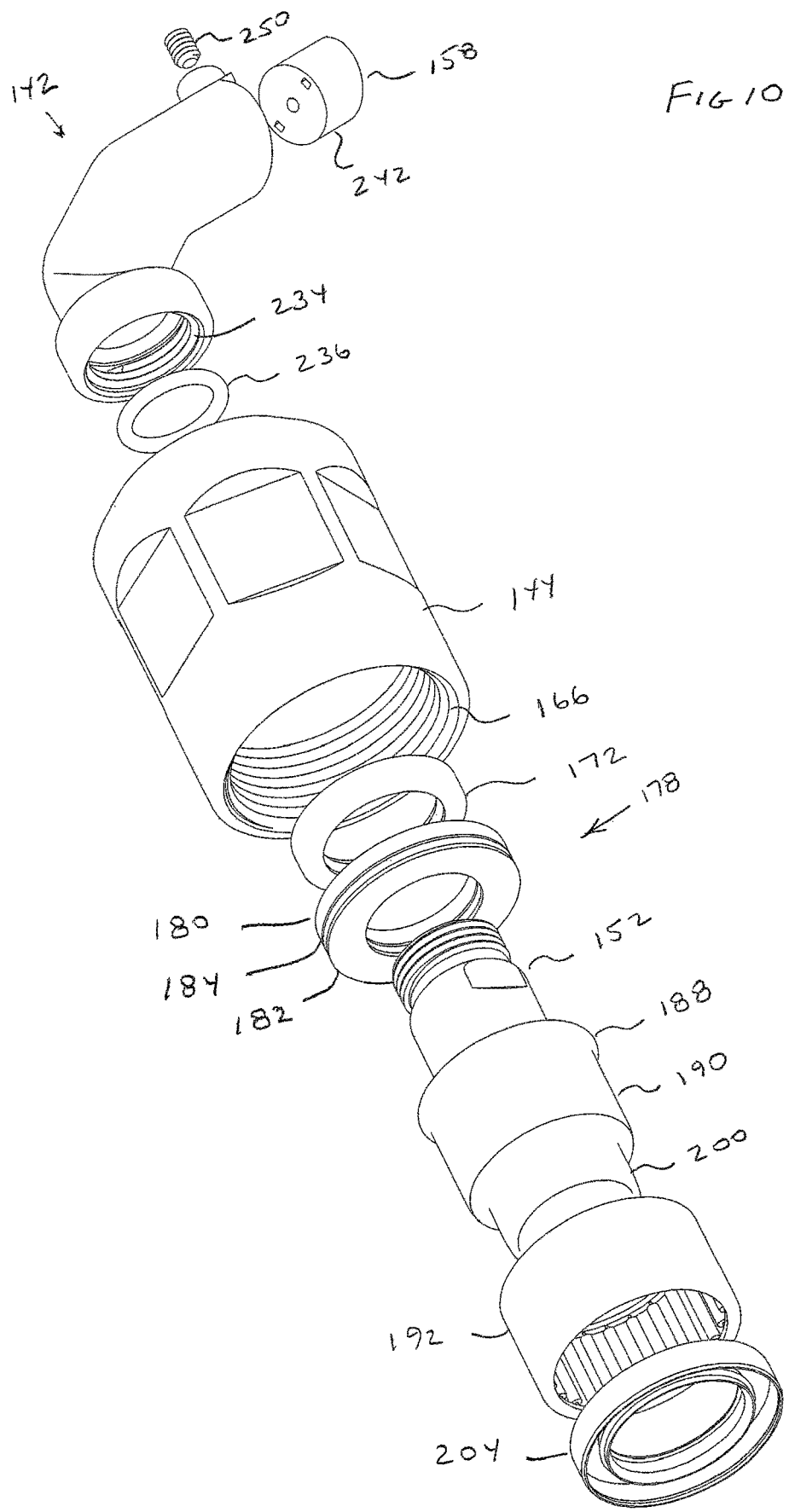

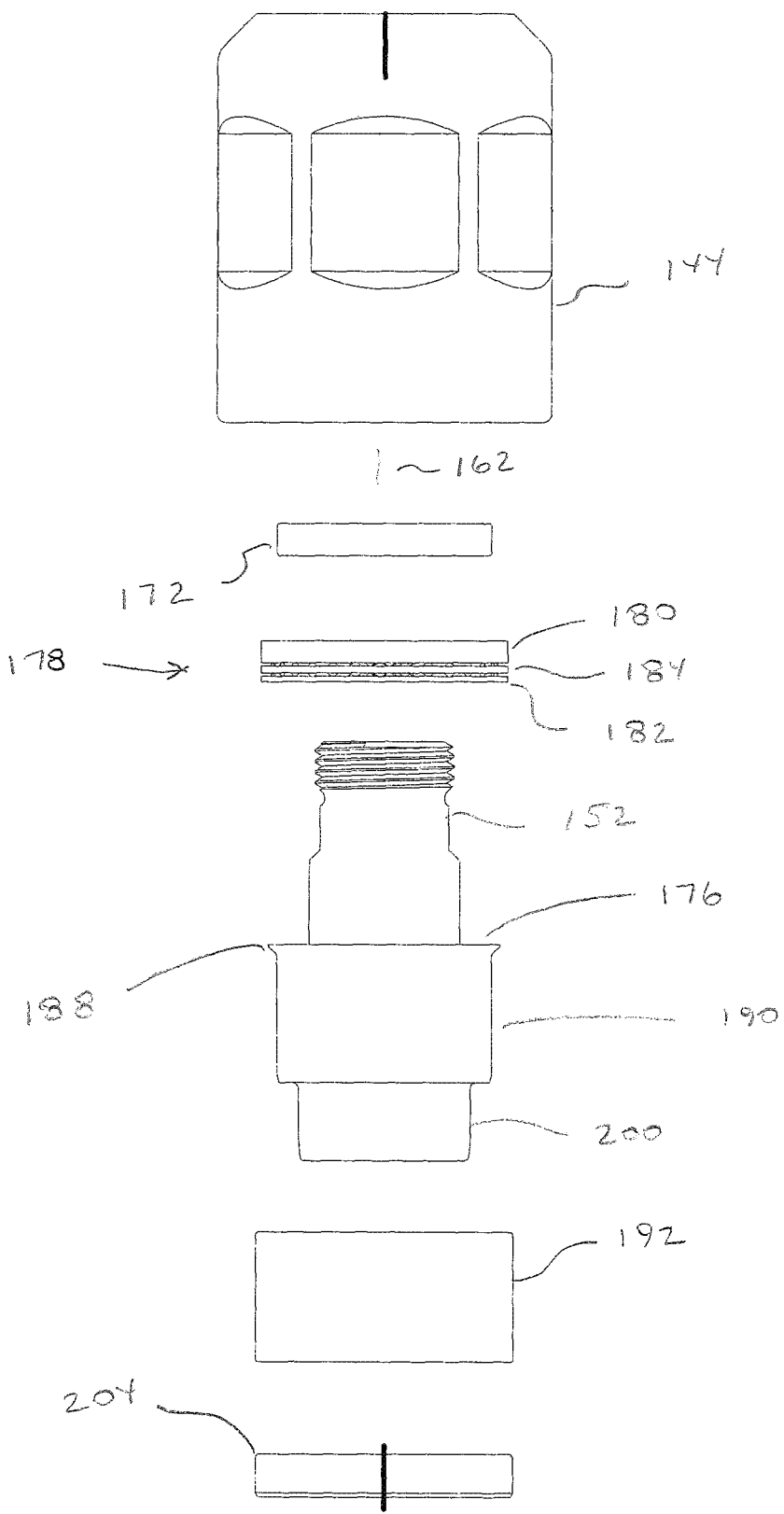

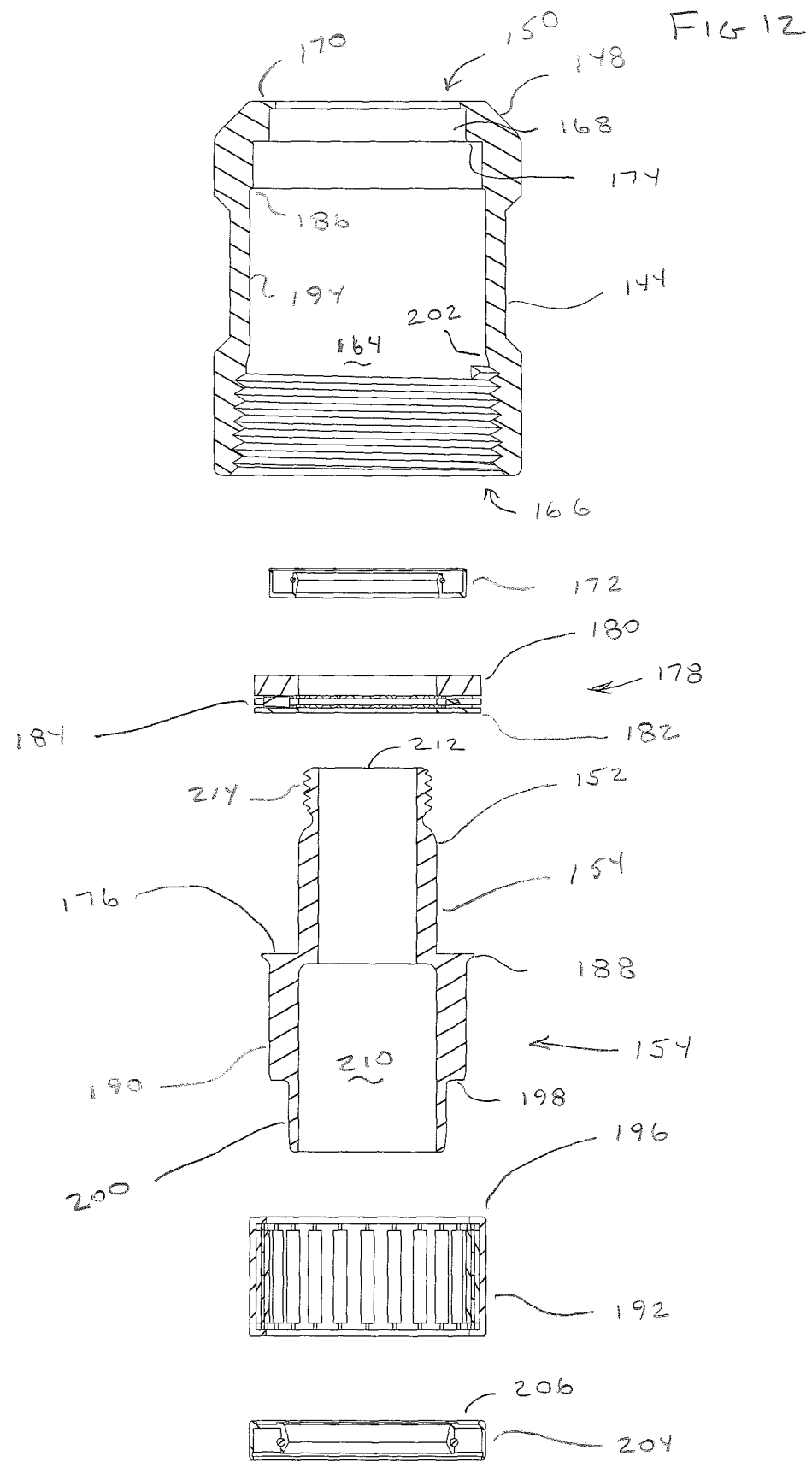

184

192

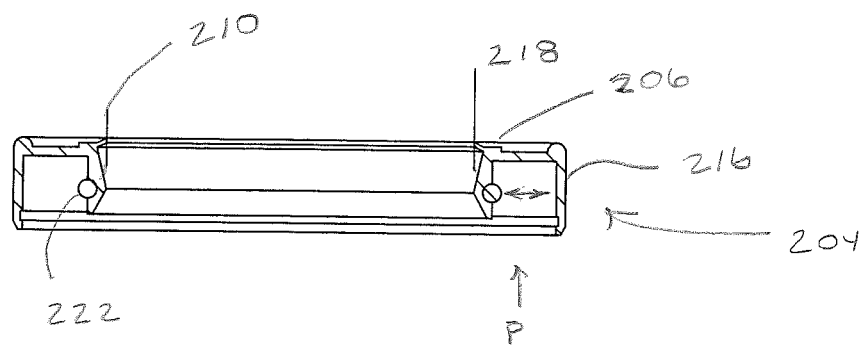
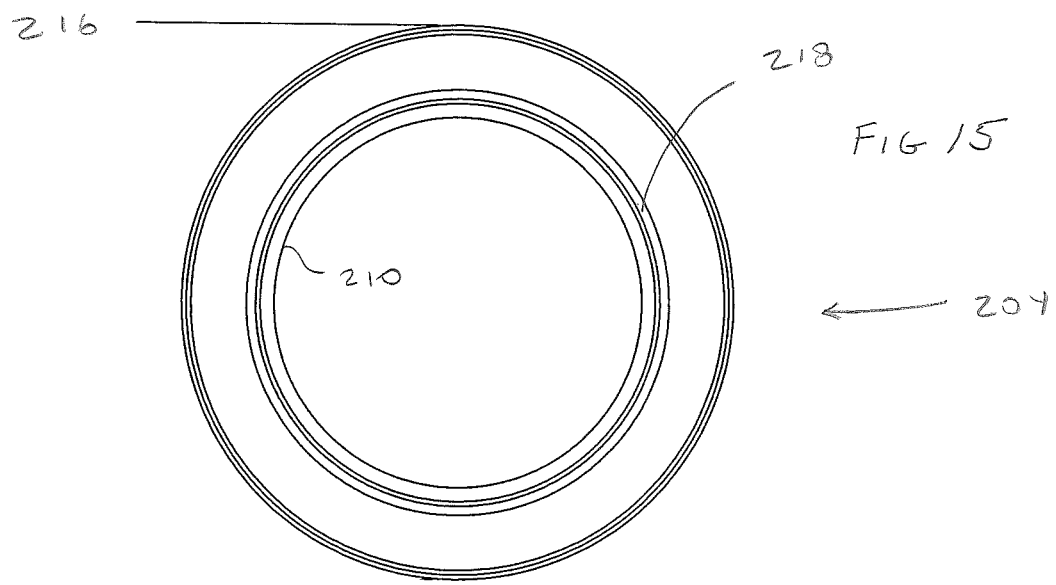

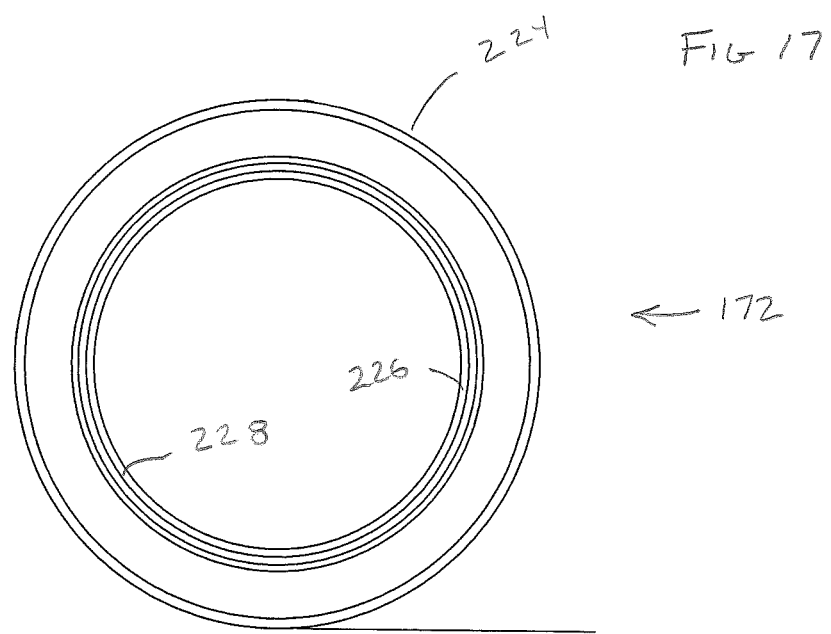
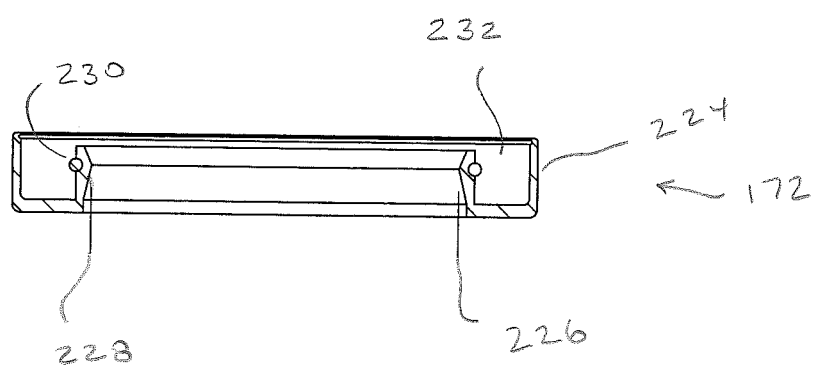

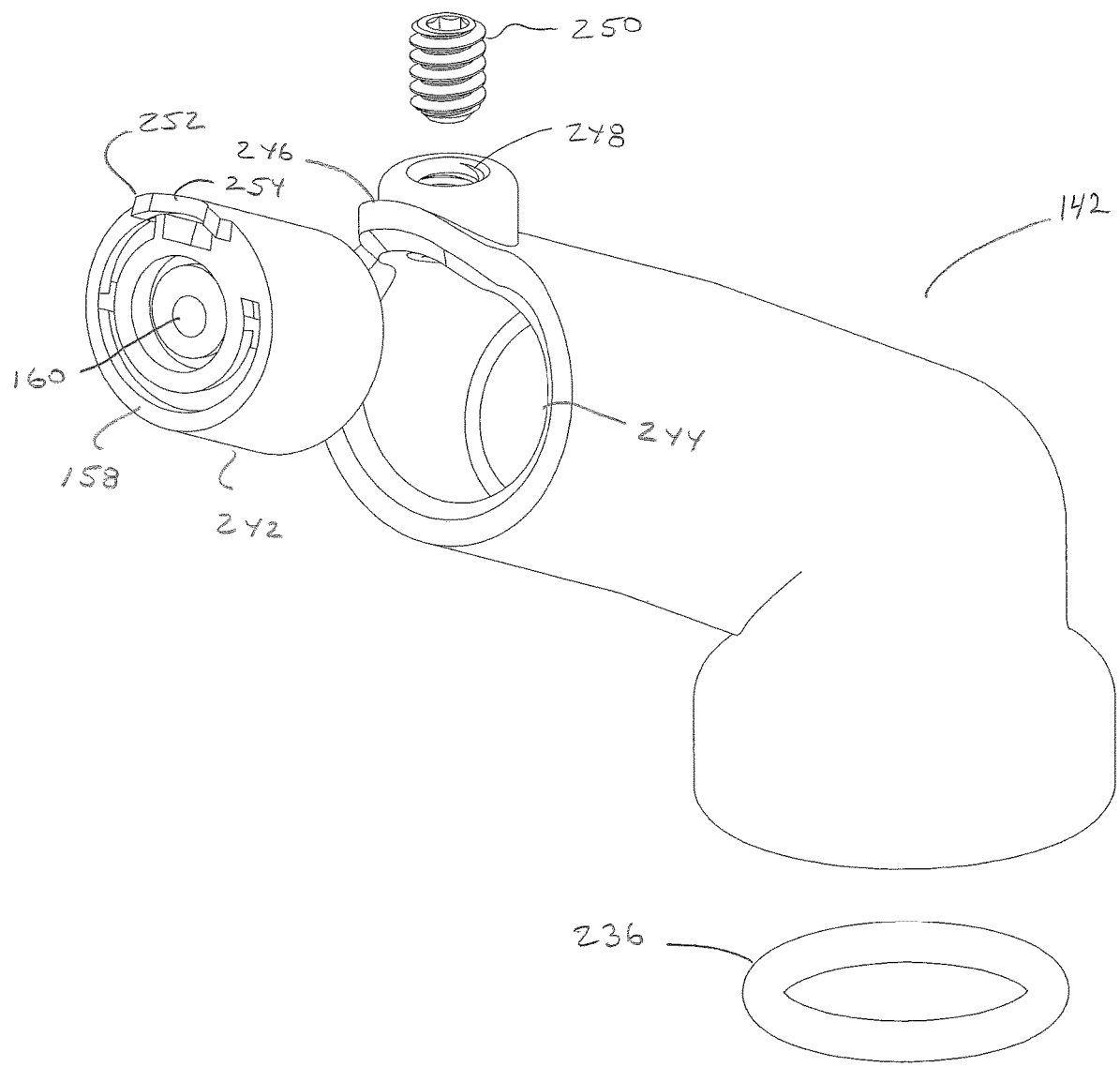

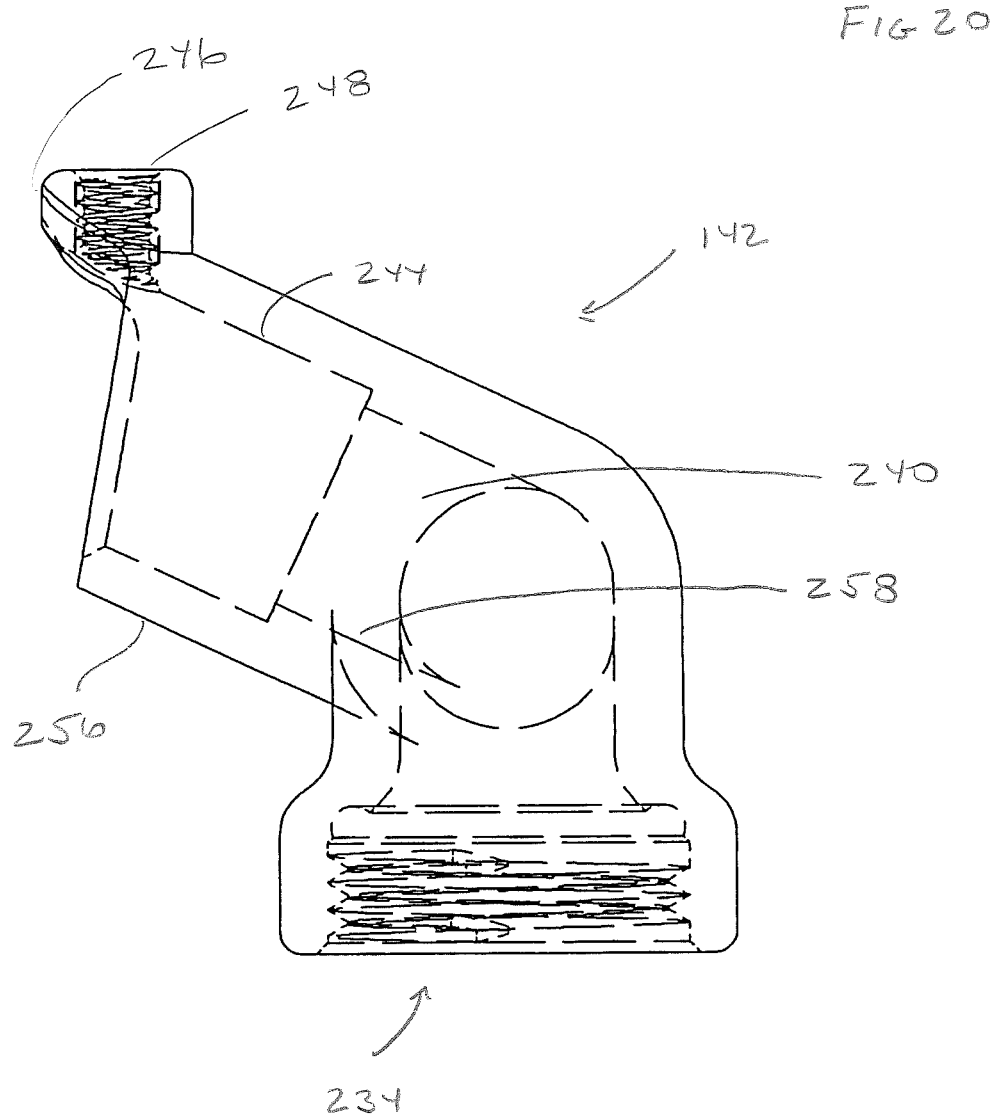

WASTEWATER SPRAY DISTRIBUTION APPARATUS

TECHNICAL FIELD

Exemplary embodiments described herein relate to sewage treatment apparatus. Exemplary arrangements further relate to apparatus for spray distribution of treated wastewater onto ground surfaces.

BACKGROUND

The proper treatment and disposal of human waste is important to prevent the spread of disease and to protect the environment. Sewage treatment plants operate to treat such waste through physical, chemical, biological and/or radiation treatment methods. Such processes have the goal of separating solid material in the waste from the water and neutralizing harmful biological and other materials.

Effective treatment processes produce effluent wastewater that is sufficiently free of harmful materials that it can be safely returned to the environment. Often with individual, residential or small commercial sewage treatment plants, this effluent wastewater is sprayed on top of the ground. The water provides irrigation for plant life and is further cleansed by passing through vegetation and downward through the soil to the aquifer.

The spraying of such effluent wastewater onto the ground may have limitations and present challenges. In cold climates the water may freeze in the sprayers preventing the discharge of the wastewater. This can stop system operation. In addition ice formation can cause damage to the apparatus used to spray the wastewater. Some treatment systems may malfunction or be subject to undesirable conditions that cause abrasive particulate material such as sand to enter the interior area of the sprayers. This may cause wear, clogging or other damage to the sprayers. In addition spray devices, particularly those that are worn or damaged, can fail to provide the desired uniform distribution of the water spray which may impede the effectiveness of the desired irrigation function and impede the desired soil migration and purification functions.

Wastewater spray distribution apparatus may benefit from improvements.

SUMMARY OF DISCLOSURE

Exemplary embodiments described herein provide a wastewater spray distribution apparatus and system that provides improved resistance to problems that result from operation in freezing temperatures. Improved operation and resistance to damage due to infiltration of contaminants is also provided by the described embodiments. Exemplary arrangements also provide for readily changing nozzles and manifolds to achieve spray distribution tailored to the particular system requirements. Control capabilities are also provided to achieve reliable and improved operation.

Further features and capabilities of exemplary embodiments are described in the following Detailed Description and the appended claims.

BRIEF DESCRIPTION OF DRAWINGS

FIG. 1 is a schematic view of an exemplary sewage treatment system.

FIG. 2 is a perspective view of an exemplary piping arrangement for the distribution of wastewater produced by the exemplary sewage treatment system.

FIG. 3 is a top plan view of an alternative exemplary piping arrangement for the distribution of wastewater produced by the sewage treatment system.

FIG. 4 is a side view of an exemplary vertically extending header pipe and water distribution sprayer in connection with an exemplary piping arrangement.

FIG. 5 is a top schematic view of an exemplary perforated distribution container arrangement used in connection with an exemplary wastewater distribution arrangement.

FIG. 6 is a side schematic view of the exemplary perforated distribution container shown in FIG. 5.

FIG. 7 is an isometric view of an exemplary wastewater distribution sprayer.

FIG. 8 is an isometric partial cutaway view of the distribution sprayer shown in FIG. 7.

FIG. 9 is a partial cutaway side view of the distribution sprayer shown in FIG. 7.

FIG. 10 is an exploded perspective view of the exemplary distribution sprayer shown in FIG. 7.

FIG. 11 is an exploded side view of the exemplary distribution sprayer shown in FIG. 7.

FIG. 12 is an exploded side cross-sectional view of the exemplary distribution sprayer shown in FIG. 7.

FIG. 15 is a top view of an exemplary lower seal used in the exemplary distribution sprayer.

FIG. 16 is a transverse cross-sectional view of the seal shown in FIG. 15.

FIG. 17 is a top view of an exemplary upper seal used in the exemplary distribution sprayer.

FIG. 18 is a transverse cross-sectional view of the upper seal shown in FIG. 17.

FIG. 19 is an isometric view an exemplary manifold having a single outlet nozzle used in connection with an exemplary sprayer.

FIG. 20 is a side view of the manifold shown in FIG. 19.

DETAILED DESCRIPTION

Figure 13:
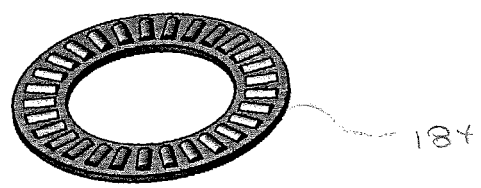
FIG. 13 is an isometric view of an exemplary needle roller thrust bearing used in the exemplary distribution sprayer.

Referring now to the drawings and particularly to FIG. 1 there is shown therein an exemplary sewage treatment system for treating human waste generally indicated 10. The exemplary system 10 is configured for use in connection with treating human waste produced in a single residential unit or a small commercial facility. However, it should be understood that the features and relationships discussed herein may be used in connection with different types of systems with different capabilities.

In the exemplary arrangement the waste material is received through an inlet 12 in a pretreatment tank 14. In the exemplary arrangement the pretreatment tank 14 provides a quiescent internal environment which enables solids and liquids to separate through settling action. Pretreatment tank 14 includes a cylindrical riser 16 which bounds an opening 18 through which the interior of the pretreatment tank may be accessed for cleanout and other purposes. A removable lid 20 is normally installed to close the opening 18 when the system is in operation. In the exemplary arrangement the pretreatment tank 14 and the lid 20 are comprised of fiberglass resin composite or other plastic material that is resistant to attack and corrosion from the material that is being treated. Other tanks used in the exemplary system may be comprised of similar plastic material. However in other embodiments other materials may be used.

In exemplary arrangements the pretreatment tank 14 as well as other tank components which are part of the system and that are hereinafter discussed, are buried below ground level which is generally indicated 22. In the exemplary arrangement lid 20 and the other removable lids for the tanks, are accessible from above ground level so that they can be readily removed for cleanout or other maintenance activities. Further in exemplary arrangements pretreatment tank 14 and the other tank components are positioned below ground level so that the material therein extend below a frost line 24. In exemplary arrangements the frost line 24 is a level below ground level at which the temperature does not fall below the freezing temperature of water. As can be appreciated, the level below ground at which the frost line 24 is located will vary based on the climate in the area in which the system is installed. As can be appreciated in areas where the frost line is further below ground level than as represented in FIG. 1, the tanks of the system may be buried deeper below ground level and the risers may be longer or multiple risers may be stacked so that the openings thereof are accessible on the surface. Of course these approaches are exemplary and in other embodiments heating devices or other approaches may be utilized for purposes of assuring that the system is not subject to becoming inoperable due to freezing of liquid therein.

In the exemplary arrangement the top level of the liquid that is separated in the pretreatment tank rises as more material is introduced to the inlet 12 of the tank as the system is started with the tank in an empty condition. The liquid in the pretreatment tank rises in a standpipe 26 and flows out of the pretreatment tank 14 by gravity through an outlet 28 once the top of the liquid reaches the level of the outlet.

The outlet 28 of the pretreatment tank is fluidly connected to an inlet 30 of an aeration tank 32. The aeration tank 32 is a generally cylindrical tank which has positioned therein an annular funnel-shaped baffle 34. The baffle 34 has an open bottom end 36. The aeration tank 32 has in operative connection therewith, an air pump 38. Air pump 38 is connected to an air manifold 40. The air manifold is connected to a plurality of air lines 42 which have air outlets near the bottom inside surface of the aeration tank 32. In the exemplary arrangement the air outlets are positioned within the tank outside the periphery of the baffle 34 and have diffusers that are operative to provide a large number of relatively small air bubbles within the liquid.

In the exemplary arrangement the air pump 38 receives power that is delivered from an electrical enclosure 44. The electrical enclosure 44 includes circuitry that is used for controlling the air pump and other components of the system as later discussed. The enclosure is in operative connection with a control panel 46. The exemplary control panel 46 includes input devices and output devices. The output devices are operative to indicate the condition of various devices within the system and the input devices are operable to receive user inputs that are used to control the electrical devices. In an exemplary arrangement the exemplary enclosure, control panel and air pump are configured to be positioned in a riser 48 that can be selectively accessed and closed by a lid 50. Of course it should be understood that this approach is exemplary and in other embodiments other approaches may be used.

In the exemplary arrangement the material from the pretreatment tank 14 enters the aeration tank through the inlet 30 and is initially on the outside of baffle 34. The air that is introduced to the liquid through the air lines 42 is operative to oxygenate the waste liquid. This facilitates the growth of aerobic bacteria. The aerobic bacteria feed on the organic waste and decompose it. The oxygenated material and bacteria enter the interior area of the baffle 34 through the open bottom baffle end 36. Solid material within the interior of the baffle falls downward toward the bottom of the tank as clarified liquid moves upward within the baffle 34.

The clarified liquid within the baffle 34 enters a standpipe 52. From the standpipe 52 the material enters an aeration chamber 54. An air line 56 that is fluidly connected to the air manifold 40 delivers further air and oxygen into the material in the chamber 54. This replenishes the oxygen within the material and further facilitates the clarifying action of the aerobic bacteria.

Chamber 54 is fluidly connected to an irradiation chamber 58. Chamber 58 houses at least one UV radiation source 60. In exemplary arrangements UV radiation source 60 comprises one or more UV light tubes that are operative to output high levels of UV-C radiation. The UV-C radiation is operative to kill bacterial and other biological organisms in the liquid that passes through the irradiation chamber 58. The action of the UV radiation disinfects the clarified material. The liquid in the irradiation chamber 58 flows by gravity to an outlet 62. Of course it should be understood that the use of UV radiation as a disinfecting method in the treatment system is exemplary, and in other embodiments ozonation or other and/or additional disinfecting methods and equipment may be used.

The exemplary aeration tank 32 includes a further riser 64 which is closable by a removable lid 66. In the exemplary arrangement the riser is positioned so that the UV radiation sources and air manifold 40 are generally accessible through the riser for purposes of servicing and replacing such items.

The treated liquid that passes out of the aeration tank 32 flows by gravity from the outlet 62 to an inlet 68 of a filter tank 70. In the exemplary arrangement the treated liquid further undergoes settling action in the quiescent environment within the interior of the filter tank. In alternative arrangements the filter tank may include a disinfecting UV-C radiation source. The disinfecting radiation source in the filter tank may be provided as an alternative to, or in addition to, the radiation source in the aeration tank. In the exemplary arrangement the liquid within the filter tank passes upwardly through a standpipe 72. In the exemplary arrangement the standpipe 72 is fluidly connected to a filter 74. The exemplary filter 74 includes a plurality of stacked plate filter elements. The stacked filter elements are operative to remove remaining solids in the treated material. Of course it should be understood that in other embodiments other types of filtration media and filtration devices may be used.

In the exemplary arrangement the filter tank 70 includes a riser 76. The opening bounded by the riser is closable by a removable lid 77. In the exemplary arrangement the riser is configured to provide access to the interior area of the filter tank for purposes of replacing the filters, cleaning out the tank interior or performing other service activities.

In the exemplary treatment arrangement the filtered liquid that has passed upwardly through the filter 74 leaves the filter tank 70 through an outlet 78. Liquid from the outlet 78 passes by gravity to an inlet 80 of a sewage treatment water effluent tank 82. The effluent water tank 82 serves as a storage tank for water that has been clarified and disinfected through operation of the sewage treatment system. In the exemplary arrangement a submersible pump 84 is positioned in the interior area of the water tank 82. The pump 84 is in operative connection with an outlet line 86. The exemplary outlet line 86 extends upwardly within the water tank 82 adjacent to an area within riser 88. This arrangement facilitates removal of the pump 84 and the attached outlet line 86 through the opening in riser 88. The riser 88 is selectively closed by a lid 90. The exemplary water tank 82 further includes a riser 92 which is selectively closable by a lid 94. In exemplary arrangement the riser 92 is accessible to provide access to the area of the inlet 80 to the water tank. Of course it should be understood that this arrangement is exemplary and other embodiments other arrangements may be used.

The exemplary outlet line 86 is connected to a water tank outlet 96. The water tank outlet is surrounded by a sheath 98. The sheath 98 is configured to isolate the outlet 96 and other connected piping from the surrounding soil. The sheath also operates in exemplary embodiments to provide a layer of air adjacent to the water piping. Insulating materials which prevent heat transfer may also be included in the sheath. The surrounding layer of air and/or other types of materials provides insulation that reduces the risk that the water in the pipe will be subject to freezing. The sheath in exemplary arrangements is comprised of plastic. This approach is used with the distribution piping to the sprayers used in exemplary embodiments to distribute the effluent water from the water tank 82 as later discussed.

The exemplary water tank 82 further includes level sensors 100 positioned therein. Level sensors 100 are in operative connection with the control circuitry of the treatment system. The exemplary level sensors 100 are operative to detect the level of water currently held in the water tank 82. The control circuitry is operative responsive to detecting that the water level has risen to a particular level to cause the pump 84 to operate to discharge the water from the tank to the system of piping headers and sprayers like those later discussed. The exemplary level sensors further enable detecting when the level in the tank has fallen to a further level which in the exemplary arrangement indicates that most of the water within the tank 82 has been discharged by the pump. Responsive to detecting water at this lower level, the control circuitry is operative to cause the pump 86 to discontinue pumping action and shut off. In exemplary embodiments different types of control systems, level sensors and pumps may be utilized.

In exemplary embodiments the water tank outlet 96 is in operative connection with a water distribution system 102, which is shown schematically in FIG. 2. In this exemplary arrangement the water tank outlet 96 which receives the water pumped out of the tank through operation of the pump, is connected to a horizontal distribution pipe 104. The horizontal distribution pipe 104 is connected to pipes 106 and 108 which extend generally horizontally and which are disposed from one another a horizontal distance. Pipes 106 and 108 are fluidly connected to respective vertically extending header pipes 110, 112. As represented in FIG. 4, in the exemplary arrangement each distribution header pipe 112 extends vertically and is surrounded by a sheath 114 in a manner like that previously discussed. The exemplary sheath 114 extends above the ground level 22. The exemplary sheath includes a top cap 116 through which the header pipe 112 upwardly extends. In the exemplary arrangement the sheath and top cap are comprised of a suitable plastic material which separates the header pipe from the ground and provides an insulating annular layer of air or other insulation between the outside of the header pipe and the inside of the sheath. Of course this approach is exemplary and in other embodiments other approaches may be used.

In the exemplary arrangement a rotatable water distribution sprayer 118 is attached to the top of the vertically extending header pipe. In the exemplary arrangement the sprayer is operative to rotate responsive to thrust produced by the water that exits through the sprayer to provide a dispersed water distribution pattern. In the exemplary arrangement the vertically extending header pipe and the surrounding sheath are configured to extend continuously vertically from the sprayer 118 and within the ground to below the frost line 24. This is done in exemplary systems to minimize the risk of freezing or other issues in a manner like that later discussed.

As further shown in FIG. 2, in the exemplary water distribution system 102, pipes 106 and 108 are fluidly connected to a generally horizontally extending collection pipe 120. In system 102 collection pipe 120 is fluidly connected to an outlet line 122. In some exemplary arrangements where the distribution pipe 104 and pipes 106 and 108 are all vertically higher than the water tank outlet 96, there is generally no need for a horizontal collection pipe and outlet line. This is because in such exemplary arrangements when the action of the pump 84 is stopped, water in the sprayers and vertically extending header pipes and other pipes will drain back into the water tank 82. However, in other arrangements where the levels of the distribution piping are such that the water that has been pumped toward the one or more sprayers in the system cannot drain by gravity back to the water tank 82, a collection pipe 120 and an outlet line 122 which extend downward and provide for the water to drain from the sprayers and vertically extending header pipes is used.

In some exemplary arrangements the outlet line 122 is fluidly connected to a perforated distribution container generally indicated 124. The exemplary perforated distribution container of an exemplary arrangement is shown in FIGS. 5 and 6. The exemplary perforated distribution container includes a drain water holding tank portion 126. The drain water holding tank portion is fluidly connected to the outlet line 122. A drain valve 128 is operative to selectively either fluidly connect or fluidly separate the outlet line 122 and the other piping and vertically extending headers connected thereto, and the perforated distribution container 124. In some exemplary arrangements the drain valve 128 may be an electrically actuated valve such as a solenoid valve that is in operative connection with control circuitry which also controls the pump and other components of the system. In other exemplary arrangements the drain valve 128 may be operative responsive to fluid pressure or other conditions so that the drain valve is closed when the pump is operated to deliver water to the sprayers, and the drain valve opens responsive to a drop in pressure when pumping action is discontinued. Of course these approaches are exemplary of numerous different approaches that may be used.

In the exemplary arrangement the drain water holding tank portion 126 of the perforated distribution container 124 is connected to a conduit 130. The conduit 130 is connected to an elongated liquid release portion 132. In the exemplary arrangement the release portion 132 includes numerous openings that enable water that passes through the conduit 130 to pass from the release portion into the soil that surrounds the release portion. This enables the water to migrate downwardly through the soil for purification purposes and so that the water can eventually reach the aquifer. The exemplary perforated distribution container 124 further includes a removable lid 134 which closes the tank portion. In the exemplary arrangement the tank portion extends upwardly to ground level. This enables access to the valve 128 and the interior of the tank portion 126 for purposes of clean out or other servicing purposes. Further in exemplary arrangements the lower portion of the tank portion 126 and the elongated release portion 132 are positioned below the frost line so as to avoid freezing and any problems that may result therefrom. Of course these approaches are exemplary and in other embodiments other approaches may be used.

In some exemplary arrangements it may be desirable for the system to distribute the effluent water through different sprayers located in dispersed areas at different times. This may be done for example in situations where the operator of the system finds it desirable to deliver the water to different vegetation on the ground at different times. For example certain types of vegetation on the ground may benefit from having more water provided thereto, while other types of vegetation located in different areas in which the water can be delivered, grow better with less water. Further in some arrangements the available pressure and volume from the pump may only be sufficient to operate a subset of the available sprayers at one time. There may also be other reasons why it may be desirable to have selective control over the operation of the available sprayers.

FIG. 3 shows an alternative water distribution system 136. Water distribution system 136 is generally similar to water distribution system 102 except as otherwise mentioned and the same reference numerals will be used to refer to components in common therewith. Water distribution system 136 includes a plurality of valves 138, 137, 133 and 131. In an exemplary arrangement the valves may be solenoid or other selectively controllable valves to allow or shut off flow through the valve. In exemplary arrangements the valves may be controlled by the control circuitry associated with the pump and other system components. For example, when it is desired to deliver water through the sprayer associated with the header pipe 110, the pump may be operated and valve 138 placed in an open condition while the other valves remain closed. This will cause the water to be delivered through the vertically extending header pipe 110 but not the vertically extending header pipe 122. Similarly, when water is to be delivered through the sprayer associated with the header pipe 122, the pump may be operated while valve 137 is open and the other valves are closed. When water is to no longer be delivered through the water distribution system 136, valves 131 and 133 may be opened to enable water to be passed through the outlet line to the perforated distribution container. Of course it should be understood that while the selective delivery of water to only two sprayers is shown, in other arrangements the water distribution system may include many more sprayers and suitable valving arrangements to selectively deliver water onto the ground through each of the sprayers or sets thereof.

An exemplary sprayer 118 is shown in FIG. 7. The exemplary sprayer 118 includes a base 140 and a manifold 142. The base 140 includes a body 144 which is configured to fluidly connect to the top of a vertically extending header pipe. The exemplary body 144 includes a plurality of wrench flats 146. The wrench flats 146 facilitate engagement of the body with a tool that enables turning the body to engage or disengage pipe threads or similar connectors at the end of the header pipe.

The exemplary body further includes an outlet body end 148. The outlet body end 148 includes an outlet body end opening 150. A nipple end 152 of a rotatable hub 154 extends outward from the body through the outlet body end opening 150. The exemplary nipple end 152 includes wrench flats 156. The exemplary wrench flats 156 facilitate holding the hub 154 stationary with a tool when the manifold 142 is threadably engaged or disengaged from the hub. Manifold 142 includes an outlet nozzle 158. The outlet nozzle 158 includes openings 160 for passing water therefrom. The exemplary outlet nozzle 158 and openings 160 are offset from an axis 162 of rotation of the hub and the manifold by a radial distance. The offset of the outlet nozzle from the axis 162 and the thrust produced by the water that passes outward therefrom, causes the manifold 142 and the hub 154 to rotate when water is supplied thereto.

As shown in FIGS. 8 through 12, the exemplary base 140 is normally configured during operation with the axis 162 extending in a vertical direction. The body 144 includes a generally cylindrical internal cavity 164. The cavity is open through a mounting opening 166 at the end opposed of the outlet body end opening 150. The exemplary cavity 164 is internally threaded in the area of the mounting opening 166. The threads 167 facilitate the liquid tight engagement with a correspondingly threaded end of a vertically extending header pipe of the type previously discussed.

The exemplary cavity includes an annular outer seal recess 168 adjacent to the outlet body end opening 150 (see FIG. 12). The annular outer seal recess 168 is positioned axially inwardly of a radially inwardly extending body lip 170. The annular outer seal recess 168 is configured for accepting an outer seal 172 therein. As later discussed, the outer seal 172 is operative to seal the upper axial end of an annular liquid tight jacket, which jacket holds a lubricant material within the body.

In the exemplary arrangement the body further includes an annular radially extending annular land surface 174. The land surface 174 extends radially outward of the wall bounding seal recess 168. The exemplary hub 154 includes an annular flange portion 176. In the exemplary arrangement the annular flange portion 176 extends radially outward on the hub relative to the nipple end 152. In the operative position of the hub 154, the flange portion 156 extends in generally opposed axial relation of the annular land surface 174.

In the exemplary arrangement a thrust bearing assembly 178 extends axially between the land surface 174 and the flange portion 176 of the hub. The thrust bearing assembly of the exemplary arrangement extends in surrounding relation of the hub 154 axially outward from the flange portion 176 toward the nipple end. The exemplary thrust bearing assembly 178 includes an outer thrust washer 180. The outer thrust washer 180 extends in abutting engagement with land surface 174. An inner thrust washer 182 extends in abutting engagement with the flange portion 176. In the exemplary arrangement, a needle roller thrust bearing 184 extends axially intermediate between the outer and inner thrust washers. In the exemplary arrangement the needle roller thrust bearing 184 which is shown separately in FIG. 13, comprises a plurality of angularly spaced radially extending rollers housed in a carrier which serves to contain the rollers therein. The exemplary thrust bearing assembly 178 is operative to resist axially outward forces acting on the hub while enabling the rotation of the hub relative to the body 144. Of course it should be understood that this approach is exemplary and in other embodiments other bearing and axial thrust force supporting arrangements may be used.

In the exemplary body 144, the cavity 164 includes an annular outward extending surface 186. Surface 186 extends radially outward relative to the generally cylindrical portion of the wall adjacent to the thrust bearing assembly. The hub 154 further includes a radially outward extending annular step 188. In the exemplary arrangement the annular radially outward surface 186 in the body and the radially outward extending annular step 188 of the hub are generally radially aligned in the operative position of the hub. A cylindrical hub portion 190 extends axially in the cavity from the step 188 toward the mounting opening 166.

Figure 14:
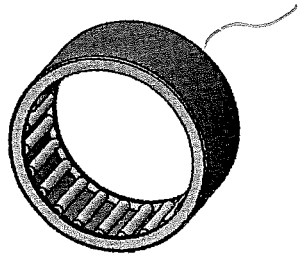
FIG. 14 is an isometric view of an exemplary annular needle bearing used in the exemplary distribution sprayer shown in FIG. 7.

A cylindrical bearing 192 extends in surrounding relation of the cylindrical hub portion 190. In the exemplary arrangement bearing 192 comprises a plurality of axially extending needle rollers as shown in FIG. 14. The cylindrical bearing 192 extends in surrounding relation of hub portion 190 inwardly of an annular wall portion 194 which extends axially from the annular outward surface 186 toward the mounting opening 166. An upper annular face 196 of the cylindrical bearing 192 is held in position by engagement with the annular outward extending step 188 on the hub and the annular outward surface 186 of the body. Such engagement facilitates maintaining the bearing 192 and the hub in the operative hub position while enabling the rotation of the hub responsive to the thrust provided by the water that passes outward through the manifold and the outlet nozzle openings.

In the exemplary embodiment the cylindrical hub portion 190 terminates at a radially inward extending annular flange portion 198. A reduced diameter portion 200 extends axially on the hub from the flange portion 198 toward the mounting opening 166. The annular wall portion 194 which bounds the cavity 164 includes an annular seal engaging surface 202. In the exemplary arrangement the annular seal engaging surface 202 extends adjacent to the threads 167 which extend from the mounting opening. The annular seal engaging surface 202 in transverse cross-section is tapered slightly radially axially inward from the threads.

An inner seal 204 is positioned in engagement with the annular seal engaging surface 202. In the exemplary arrangement inner seal 204 includes an inner annular surface 206. In the exemplary arrangement the inward extending flange portion 198 of the hub is movable in operative engagement with the inner annular surface 206 of the inner seal 204. This arrangement enables the hub 154 to rotate in the cavity 164 and maintains axial positioning of the hub in the operative position. Of course it should be understood that this arrangement is exemplary and other embodiments other arrangements may be used.

In the exemplary embodiment the base includes a brake generally indicated 207 which is in operative connection with the hub 154 and which acts to apply a brake force that resists rotation of the hub. In the exemplary arrangement the brake includes a generally cylindrical internal liquid tight jacket 208 extends between the wall portions bounding cavity 164 within the body 144, and the hub 154. In the exemplary arrangement the liquid tight jacket 208 is sealed at the outlet body end by the outer seal 172. The liquid tight jacket 208 is sealed at the inner axial cavity end by the inner seal 204. This liquid tight jacket 208 of the exemplary arrangement isolates the cylindrical bearing 192 and the thrust bearing assembly 178 from water which passes through the base as well as from any external contaminants which may be in proximity to the nipple end outside the body. In the exemplary arrangement the liquid tight jacket 208 is filled with a lubricant liquid. In the exemplary arrangement the lubricant liquid is a silicone material which maintains a generally constant viscosity and density throughout an entire range of ambient temperatures to which the sprayer is exposed during operation. Thus in the exemplary arrangement the lubricant material, which experiences no significant change in volume with variations in temperature, helps to maintain the isolation of the items within the liquid tight jacket and maintains such items separated from water or other contaminants. As a result in some exemplary arrangements the fluid lubricant causes the brake force opposing rotation of the hub to increase with the rotational speed of the hub. In some arrangements non-Newtonian fluids may be used to achieve suitable variable speed brake force. Of course it should be understood that this approach is exemplary and in other embodiments other brake approaches and brake structures may be used.

In the exemplary arrangement the hub 154 includes an axial passage 210 therethrough. The axial passage 210 places an outlet opening 212 at the nipple end 152 in fluid communication with water in the cavity 164 within the body 144. The nipple end 152 includes an externally threaded portion 214 adjacent to the outlet opening 212. The threaded portion 214 facilitates the releasable engagement of the manifold 142 as well as alternative manifolds later discussed, with the hub.

As shown in FIGS. 15 and 16 the exemplary inner seal 204 comprises an annular seal with a generally rigid ring portion 216. The exemplary rigid ring portion 216 is in press fit contact with the annular sealing surface 202 within the cavity as previously discussed. The inner seal further includes a radially inwardly extending resilient annular portion 218. The radially inward extending annular portion 218 annularly engages the reduced diameter portion 200 of the hub to seal the inner axial end of the liquid tight jacket 208.

In the exemplary arrangement the resilient annular portion in transverse cross-section includes a flexible lip portion 210. Flexible lip portion 210 extends radially inwardly as well as in the axial direction toward the mounting opening 166. In the exemplary arrangement an annular spring 222 extends in surrounding relation radially outwardly of the lip portion 210. The spring 222 biases the lip portion to engage the reduced diameter portion 200 of the hub.

Further in the exemplary arrangement the flexible axially extending lip portion is configured so that increased sealing force is applied by the pressure of the water in the cavity 164 acting against the lip portion 210. As represented in FIG. 16, the pressure of the water acting against the seal as represented by Arrow P is operative to apply pressure force that urges the flexible lip radially inward toward engagement with the rotating hub. Thus in the exemplary seal arrangement the pressure of the water further helps to maintain the seal which preserves the integrity of the liquid tight jacket. Of course this approach is exemplary and other embodiments other approaches may be used.

Further in the exemplary arrangement the outer seal 172 is configured to further utilize pressure and force effects to reduce the risk that the integrity of the liquid tight jacket will be compromised. As shown in FIGS. 17 and 18 the outer seal 172 includes a rigid ring portion 224. The rigid ring portion 224 extends in the seal recess 168 and in abutting engagement with the inner side of the body lip 170. An annular radially inward extending resilient portion 226 extends radially inwardly from the ring portion 224 and annularly engages the nipple end 152 in sealing engagement. In transverse cross-section the resilient annular portion includes a flexible axially extending lip 228. A spring 230 extends outwardly of and in surrounding relation of the flexible lip 228. The annular spring 230 serves to bias the flexible lip radially inward and maintain it in engagement with the outer surface of the nipple end. Further in the exemplary arrangement the flexible lip extends axially outward from the ring portion. This configuration of the exemplary arrangement further helps to seal the flexible lip 228 to the nipple end.

For example in exemplary arrangements the nipple end extending outside the body is exposed to the elements such as water, snow and ice. Further the nipple end outside the body can be exposed to further contaminants such as mud, sand, grass clippings and other materials. In the exemplary arrangement such items may collect in the annular space 232 radially outward of the flexible lip 228. The presence of such materials and contaminants in the annular space will generally operate to bias the flexible lip toward sealing engagement with the adjacent nipple end. Thus the presence of contaminants is less likely to compromise the integrity of the liquid tight jacket. In addition, expansion due to freezing of water in the annular space 232 will likewise increase the sealing force provided by the exemplary outer seal configuration. Of course it should be understood that this approach is exemplary and other embodiments other approaches may be used.

The exemplary manifold 142 includes a manifold inlet 234. The manifold inlet 234 is internally threaded to releasably engage with the threaded portion 214 on the nipple end 152 of the hub. A resilient annular seal 236 extends in sandwiched relation between the nipple end and a radially inward contoured portion 238 of the interior area 240 of the manifold. In the exemplary arrangement the outlet nozzle 158 has a cylindrical body 242 that is removably positionable in a nozzle aperture 244. In the exemplary arrangement the outlet nozzle 158 is removable from the nozzle aperture 244 so that the nozzle can be cleaned or replaced with a different type of nozzle if desired. The nozzle type may be selected to provide different properties such as water dispersion, thrust, water output distance or other properties that may be desired in a given sprayer location.

In the exemplary arrangement the nozzle aperture 244 is bounded outwardly on an upper side of the manifold by a brow projection 246. In the exemplary arrangement the brow projection 246 extends outwardly from the nozzle aperture and includes a nozzle fastener opening 248 therein. In the exemplary arrangement the nozzle fastener opening 248 is configured to accept a nozzle fastener 250 therein. In the exemplary arrangement the nozzle fastener 250 comprises a set screw that is movably positionable in the nozzle fastener opening 248. Of course in other embodiments other approaches may be used.

In the exemplary arrangement the body 242 of the nozzle includes a nozzle projection 252 that extends outwardly from the nozzle opening 160. The exemplary nozzle projection 252 includes a nozzle recess 254. The nozzle recess is configured to engage the nozzle fastener 250 therein. Thus the nozzle fastener 250 may be moved by rotation in the threaded nozzle fastener opening 248 to extend into the nozzle recess 254 and thereby hold the nozzle 158 within the nozzle aperture 244. If it is desired to change the nozzle, the nozzle fastener 250 may be rotated to move outwardly and disengage the nozzle recess 254. This enables the nozzle body 252 to be removed from the nozzle aperture 244. When removed from the nozzle aperture, the outlet nozzle 158 may be cleaned or otherwise serviced. Alternatively the outlet nozzle 158 may be replaced with a different outlet nozzle with different properties. Of course it should be understood that these approaches are exemplary and in other embodiments other approaches may be used.

In the exemplary arrangement the interior area 240 of the manifold 142 is configured to facilitate the draining of water therefrom. As previously discussed, the ability to drain the water from the sprayer 118 when water is not being discharged therefrom helps to prevent freezing of the water in the sprayer and other problems. This is why in the exemplary arrangement water is enabled to be drained from the sprayers and the header pipes to below the frost line when the pumping of the water from the effluent tank is stopped. The exemplary manifold configuration includes an end portion 256. The end portion 256 includes the nozzle aperture 244. The exemplary end portion 256 is angled upwardly toward the opening which bounds the aperture. This upwardly angled configuration facilitates the draining of water which may remain in the outlet nozzle 158 when pumping is discontinued, back into the interior area 240 of the manifold.

Figure 21:
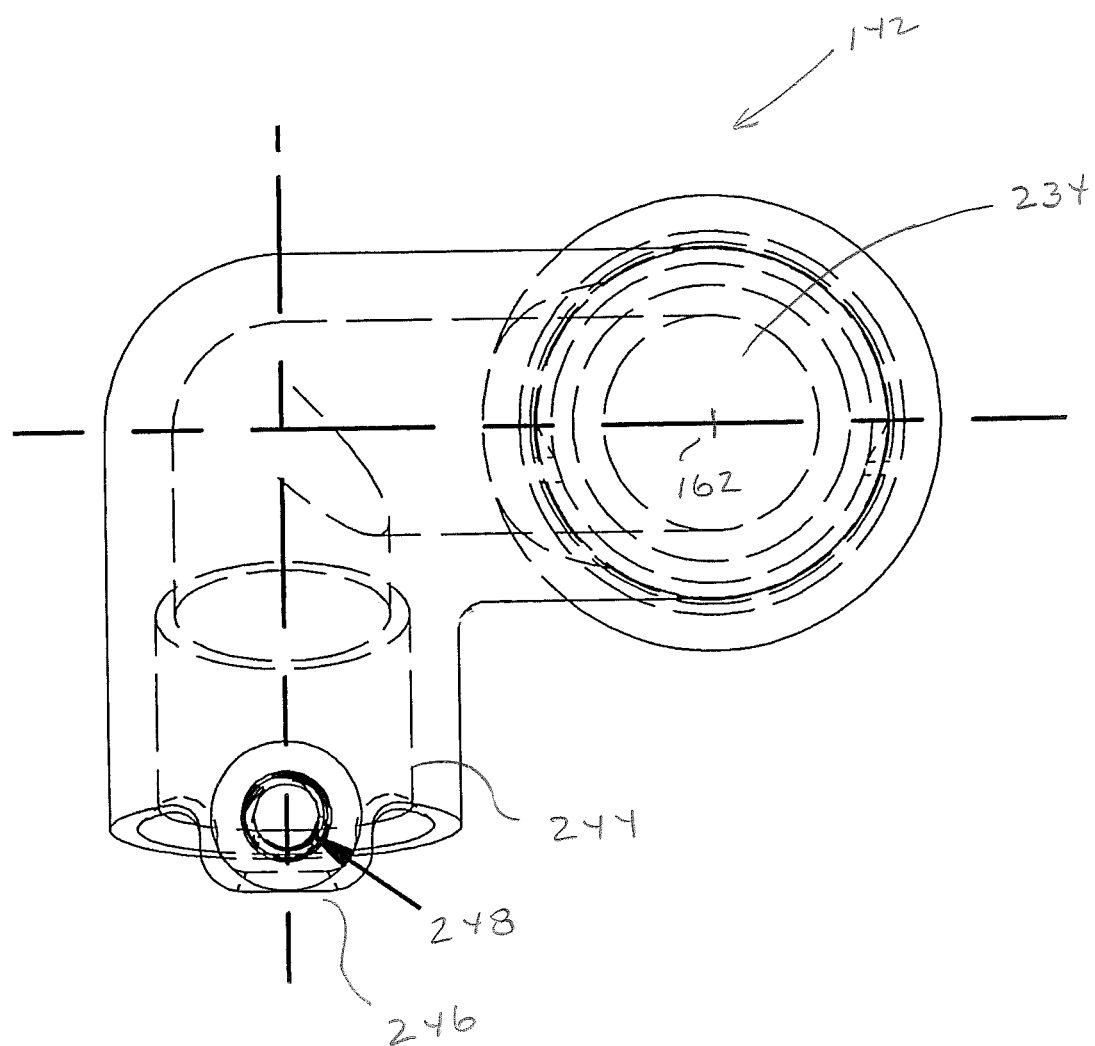
FIG. 21 is a top view of the manifold shown in FIG. 19.
Figure 22:
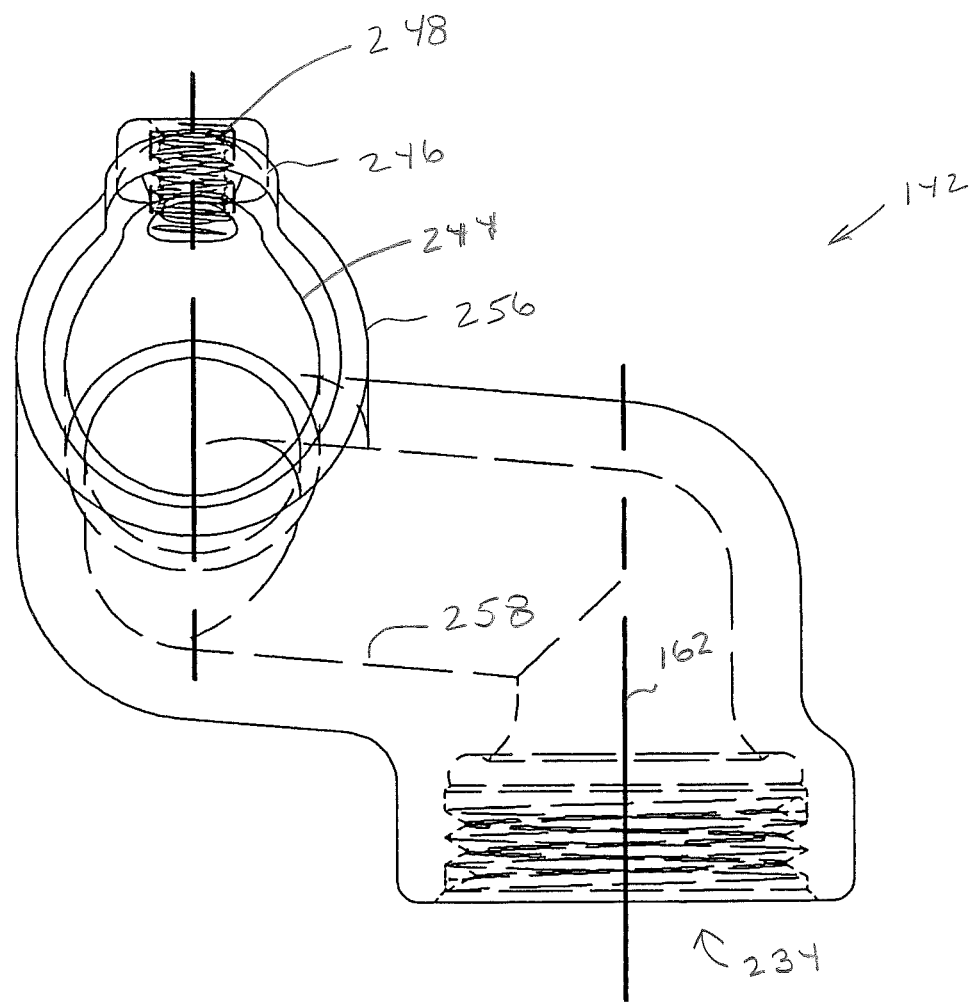
FIG. 22 is a front view of the manifold shown in FIG. 19.

Further in the exemplary arrangement the interior area 240 of the manifold is bounded by a lower manifold surface 258. In the exemplary arrangement when the axis 162 of the hub 154 extends vertically and is in engagement with the manifold 142, the lower manifold surface 258 is sloped continuously downward between the outlet nozzle and the manifold inlet 234. As shown in FIGS. 8 and 9 as well as FIGS. 20 through 22, in the exemplary arrangement the lower manifold surface 258 may comprise a plurality of surface contours or portions. However, as shown therein such contours and portions slope continuously downward from the outlet nozzle to the manifold inlet so that almost all residual water in the manifold will drain back into the axial passage 210 of the hub, and the water may move vertically downward therefrom in the vertically extending header pipe connected to the base. This facilitates draining the sprayer 118 after each use so that the water stays below the frost line when the sprayer is not in use, and reduces the risk of damage due to freezing and other conditions. Of course the configuration shown is exemplary and other embodiments other approaches may be used.

Figure 23:
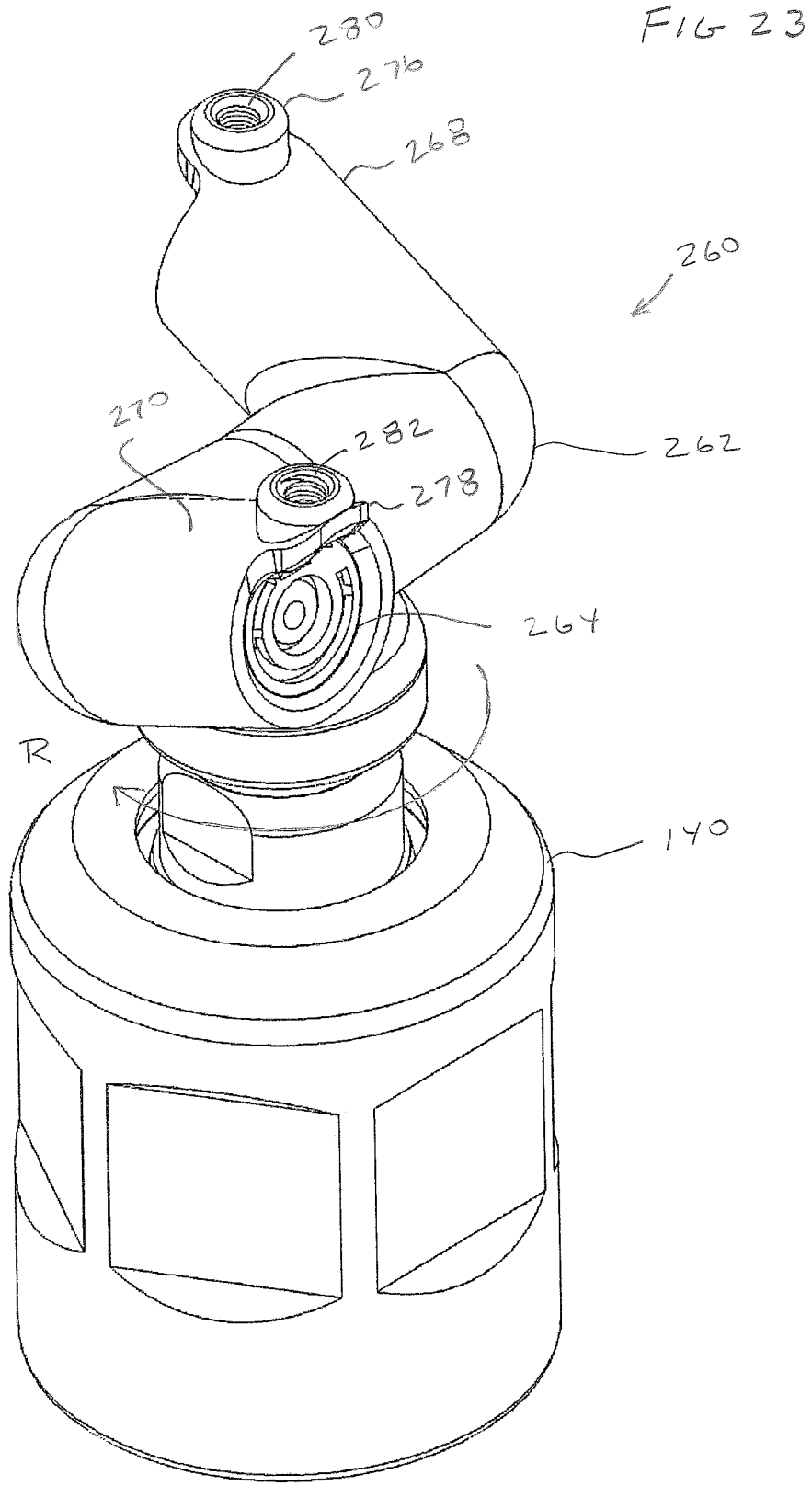
FIG. 23 is an isometric view of an exemplary distribution sprayer with the manifold including a pair of outlet nozzles.

FIGS. 23 to 26 show an alternative embodiment of the sprayer 260. The exemplary sprayer 260 includes the same base 140 of sprayer 118 previously described. Sprayer 260 uses an alternative manifold 262. Alternative manifold 262 includes a pair of outlet nozzles 264, only one of which is shown in FIG. 23. In the exemplary arrangement the outlet nozzles 264 are opposed to discharge water in generally opposed directions so as to cause the manifold to rotate in the direction of Arrow R.

In the exemplary arrangement manifold 262 includes a manifold inlet 266. Manifold inlet 266 is configured to threadably engage the nipple end 152 of hub 154 in a manner like that previously discussed in connection with manifold 142. The exemplary manifold inlet further includes a resilient seal similar to seal 236 previously discussed.

Manifold 262 includes a pair of upturned end portions 268 and 270. Each end portion includes a respective nozzle aperture 272, 274 therein. Each nozzle aperture is configured to receive an outlet nozzle 264 in releasable engagement therein. Manifold 262 further includes a brow projection 276, 278 adjacent to each respective nozzle aperture. Each respective brow projection includes a respective nozzle fastener opening 280, 282 therein. Each respective nozzle fastener opening is configured to receive a respective nozzle fastener of the type previously discussed therein for purposes of engaging a nozzle recess on a nozzle projection to hold the nozzle in the respective nozzle aperture.

Figure 24:
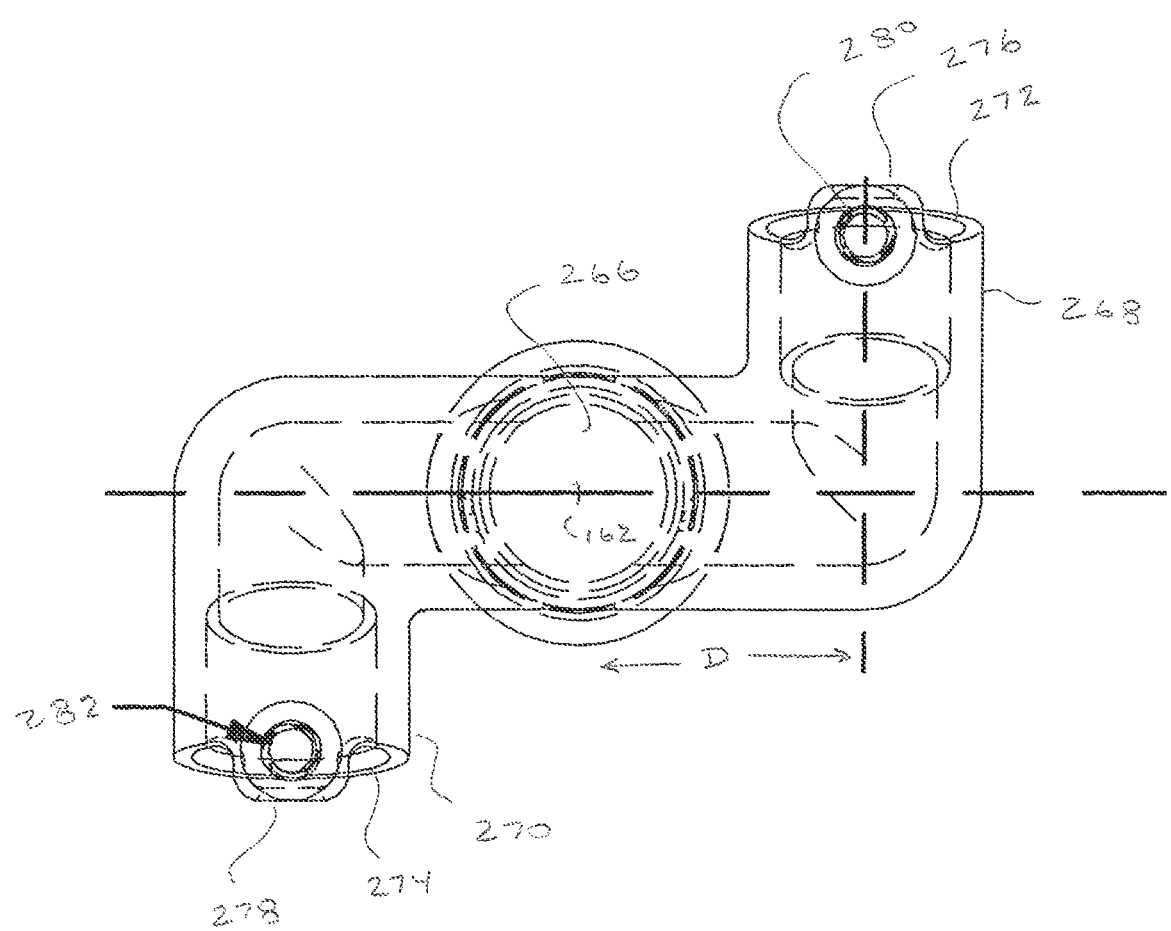
FIG. 24 is a top view of the manifold shown in connection with the sprayer in FIG. 23.
Figure 25:
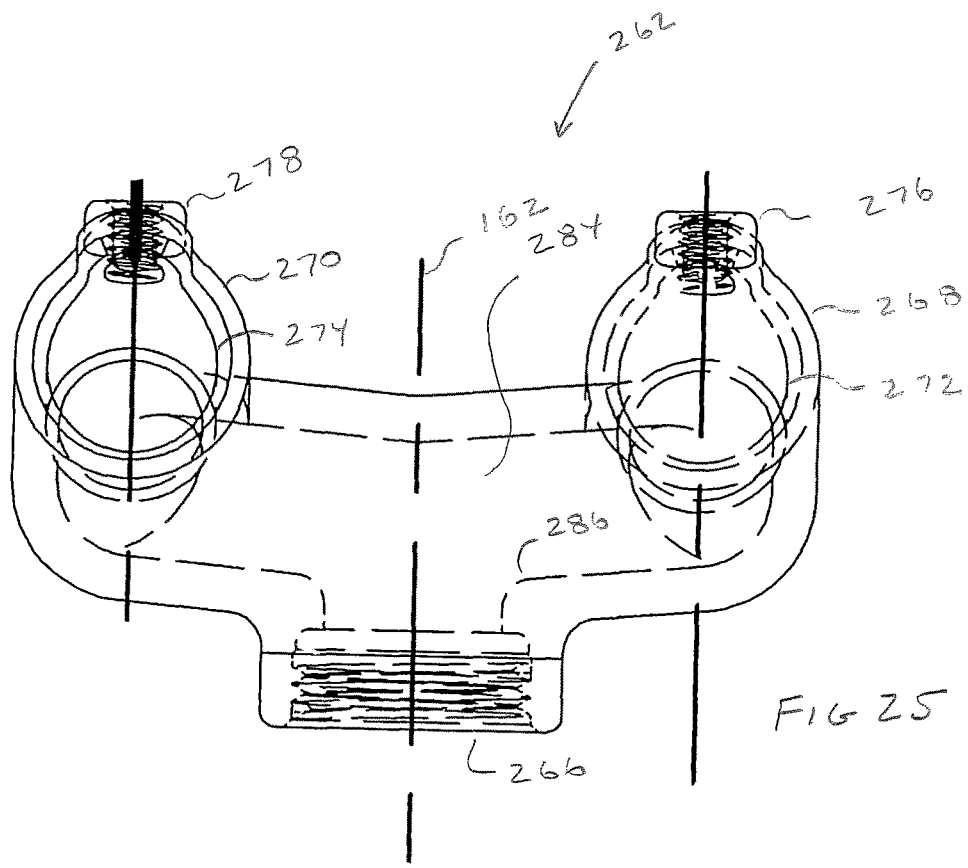
FIG. 25 is a front view of the manifold shown in FIG. 24.
Figure 26:
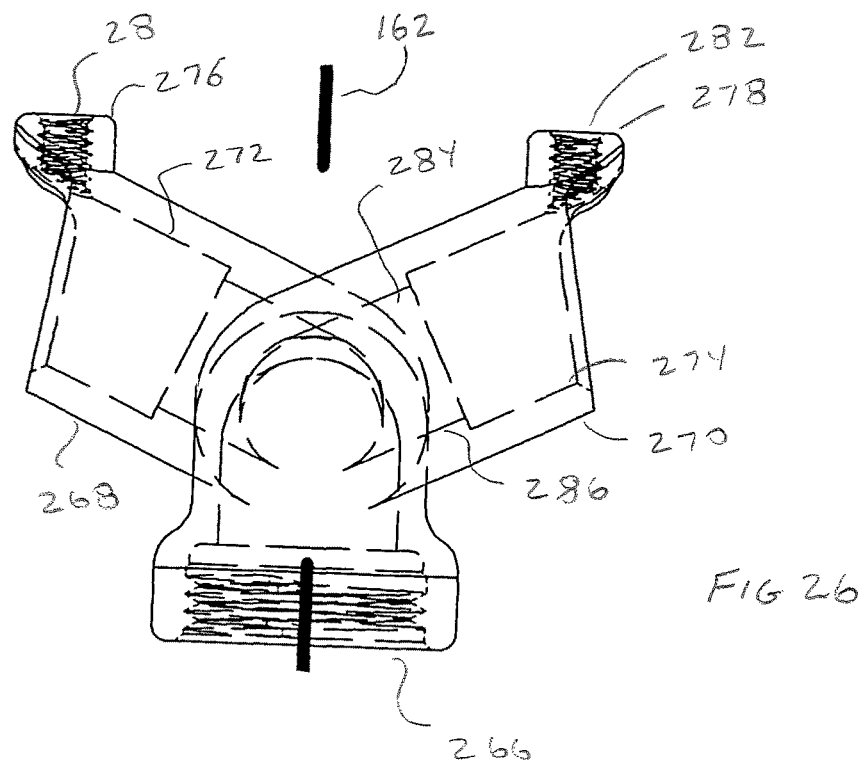
FIG. 26 is a side view of the manifold shown in FIG. 24.

In the exemplary arrangement each outlet nozzle 264 is disposed from the axis 162 a radial distance indicated by Arrow D in FIG. 24. The discharge from the outlet nozzle 264 the radial distance away from the axis produces thrust which provides a rotational force to the manifold and the hub. This rotational force is operative to overcome the brake force and rotate the manifold and the hub connected thereto in a rotational direction in a manner like that previously discussed in connection with manifold 142.

In a manner similar to that of manifold 142, manifold 262 includes an interior area 284. The interior area 284 is bounded by a lower manifold surface 286. The lower manifold surface which is comprised of a plurality of different contours and surface portions is configured to be sloped continuously downward between each of the outlet nozzles and the manifold inlet 266. Thus virtually all water which remains within the manifold after pumping action is discontinued, is drained by gravity from the manifold through the inlet 266 and downward from the base 140. This enables the water to be drained and maintained below the frost line so as to avoid freezing and other issues which could damage or prevent operation of the system. Of course it should be understood that the construction of manifold 262 as well as manifold 142 is exemplary, and numerous other manifold and nozzle configurations may be utilized in connection with embodiments employing the principles that have been described herein.

Figure 39:
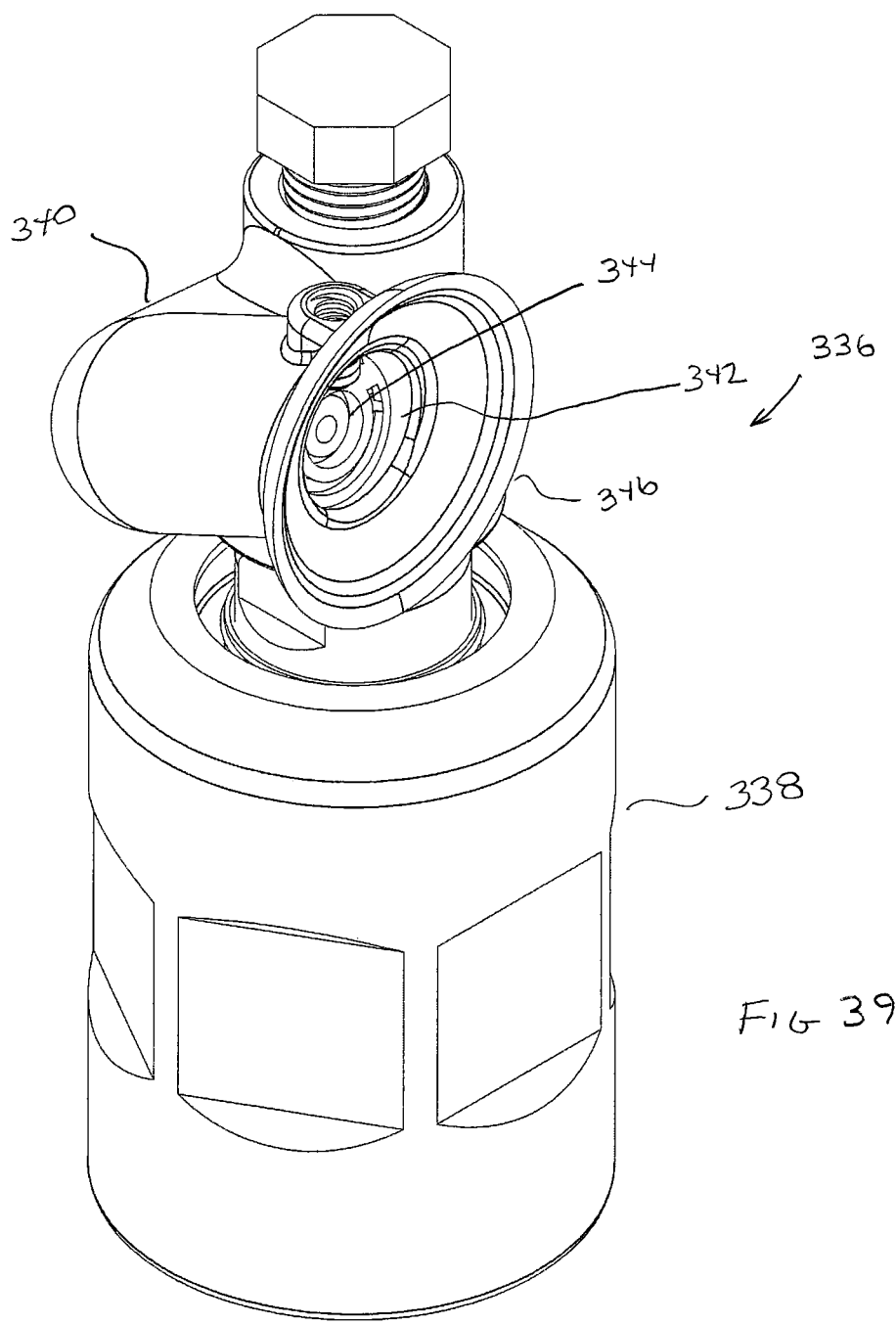
FIG. 39 is an isometric view of a further exemplary wastewater distribution sprayer.

FIG. 39 shows a further alternative embodiment of a sprayer generally indicated 336. Sprayer 336 is generally similar to sprayer 118 previously described except as otherwise noted. Sprayer 336 includes a base 338 and a manifold 340. Manifold 340 includes a nozzle aperture 342 in which a nozzle 344 is releasably positioned. An outward extending deflector having the shape of an annular outward extending bell 346 extends outside the manifold interior area and outwardly and radially away from the nozzle aperture 342. In the exemplary arrangement the deflector bell 346 extends annularly radially outward and away from the nozzle and nozzle aperture on all sides of the nozzle. However it should be understood that this configuration is exemplary and in other embodiments the outward extending deflector may only extend in certain areas outside the manifold interior area, such as outwardly and below the nozzle aperture.

In the exemplary arrangement the deflector bell or other outwardly extending deflector is operative to reduce the risk that some of the water exiting the nozzle collects on the underside of the manifold exterior and flows towards the base 338. Such flow on the exterior bottom surface of the manifold during cold conditions may cause ice accumulation in the area of the rotating nipple end of the hub that extends upward through the base. Such ice accumulation may interfere with sprayer operation. In the exemplary arrangement the configuration of the deflector bell 346 which extends outwardly and away from the nozzle opening, causes water to drip off the deflector bell at a location radially away from the nipple end of the hub. As a result during cold conditions water does not travel along the bottom of the manifold toward the base. Of course it should be understood that the configuration of the deflector bell is exemplary and in other embodiments other configurations may be used.

Figure 40:
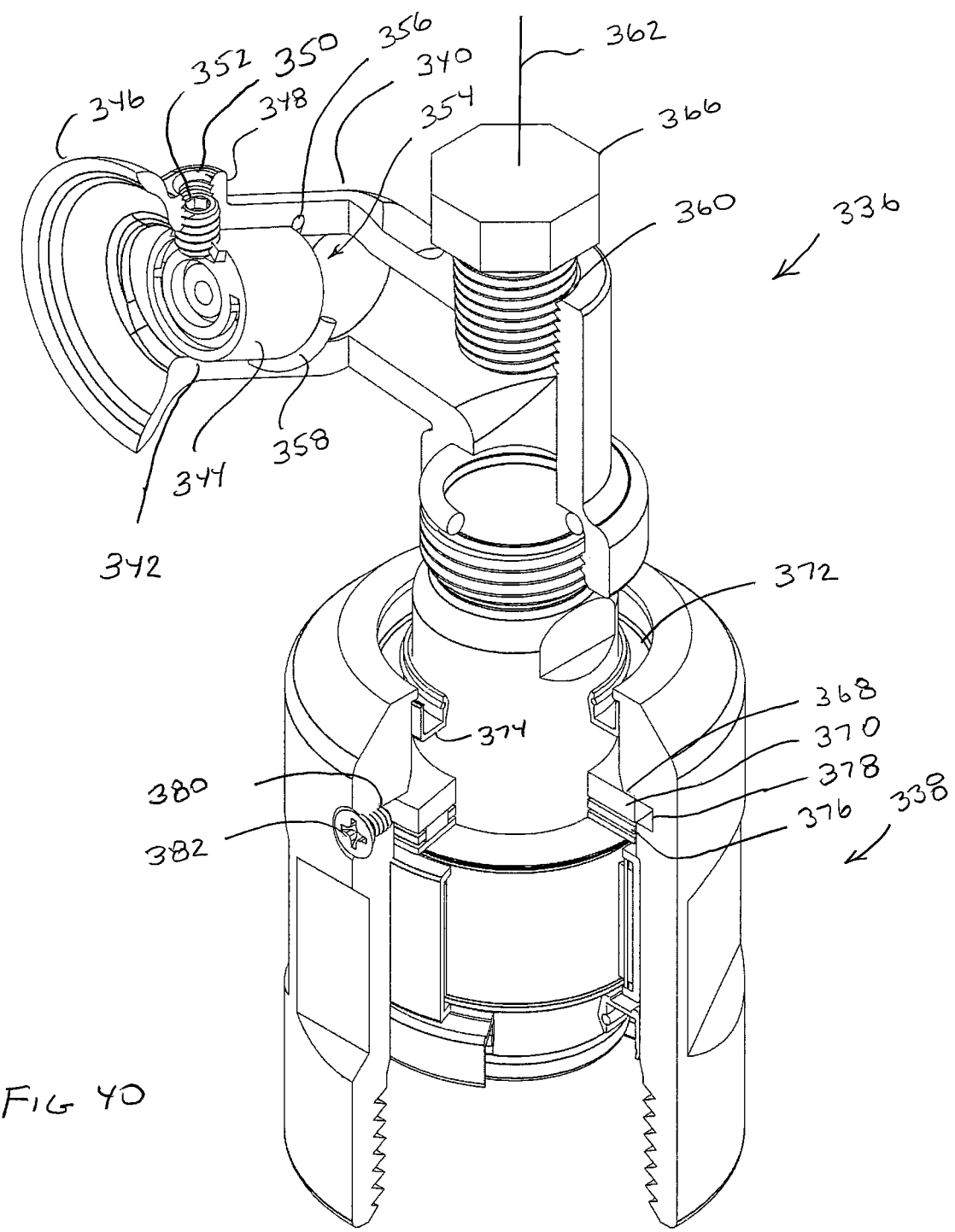
FIG. 40 is an isometric partial cutaway view of the distribution sprayer shown in FIG. 39.

As shown in FIG. 40 in the exemplary manifold 340 the deflector bell 346 includes a brow portion 348. The brow portion 348 includes a nozzle fastener opening 350 that accepts a nozzle fastener 352. The nozzle fastener is releasably engageable with a nozzle projection of the nozzle 344. As a result the nozzle fastener 352 enables selectively holding the nozzle fixed in the operative position in the nozzle aperture 342 or enabling the nozzle 344 to be disengaged from the manifold 340. Further in the exemplary embodiment the manifold interior area 354 of manifold 340 includes an annular recess 356 adjacent an inward end of the nozzle 344 when the nozzle is in the operative position. A resilient seal 358 is positioned in the recess 356. The seal 358 provides sealing engagement between the wall bounding the manifold interior area and the nozzle so as to reduce the risk of leakage in the area of the nozzle aperture on the outside of the nozzle and also helps to hold the nozzle in the operative position. Of course it should be understood that this approach is exemplary and in other embodiments other approaches may be used.

Figure 43:
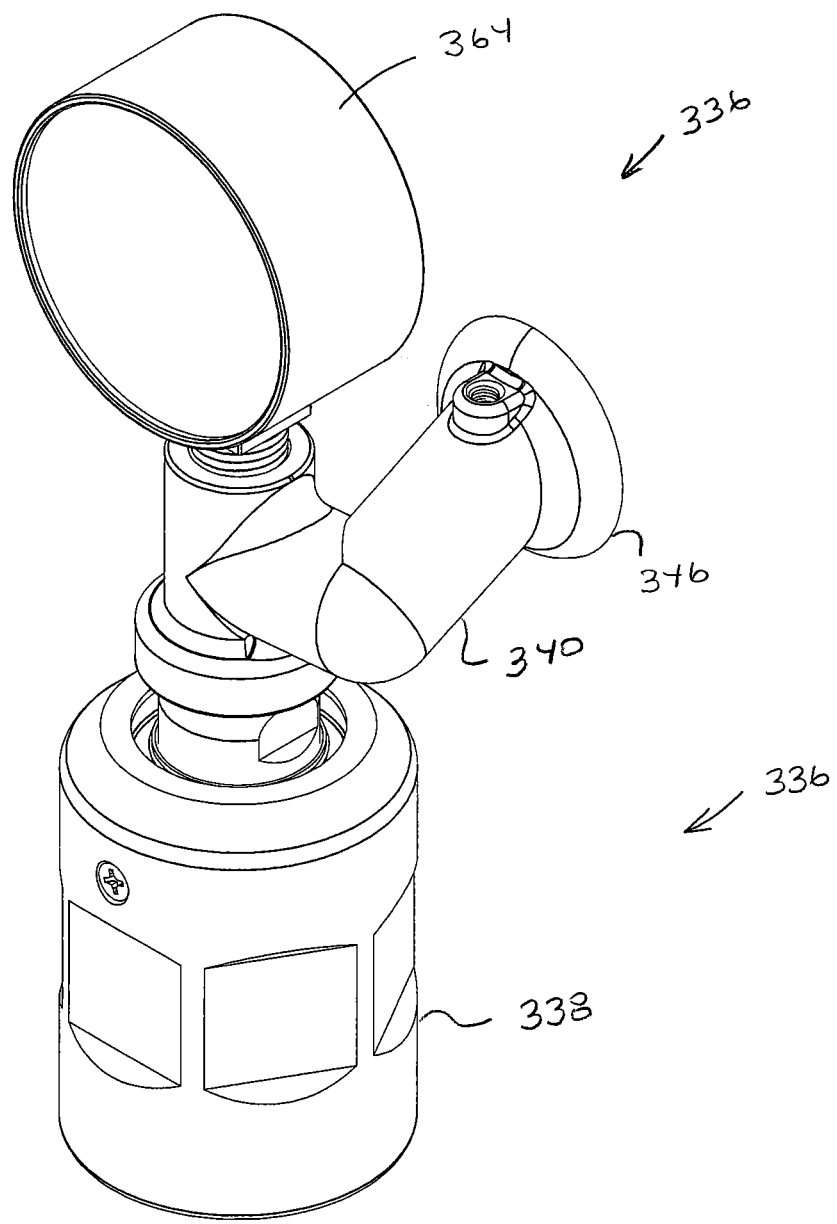
FIG. 43 is a isometric view of the sprayer shown in FIG. 39 with a pressure indicator attached thereto.

Manifold 340 further differs from manifold 142 in that manifold 340 includes a port 360. Port 360 is positioned in aligned relation with the axis of rotation 362 of the manifold. The port 360 extends from outside the manifold and into the manifold interior area 354. The exemplary port 360 is threaded and configured to releasably receive a pressure indicator such as a pressure sensor or a pressure gauge 364 as shown in FIG. 43. The engagement of a pressure indicator with the port enables determining the available pressure of liquid within the manifold for purposes of configuring the operation of the system. While the sprayer 336 may be operated in some arrangements with the pressure indicator positioned within the port 360, during modes of operation when there is not a need to know the pressure within the manifold interior area, the port 360 may be closed by a plug 366 or other releasable fitting. Of course it should be understood that this arrangement is exemplary and in other embodiments other approaches may be used.

Figure 41:
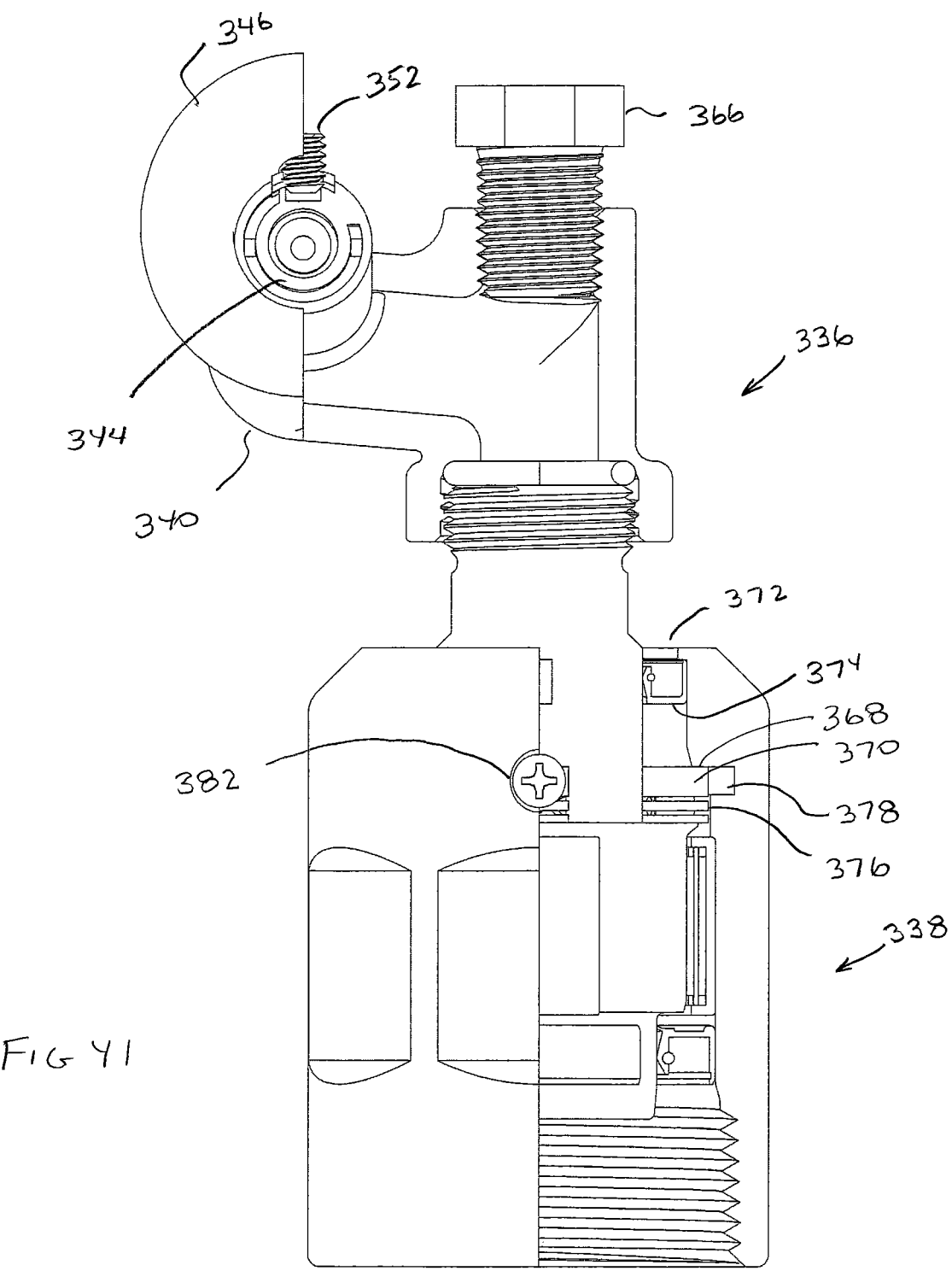
FIG. 41 is a partial cutaway side view of the distribution sprayer shown in FIG. 39.
Figure 42:
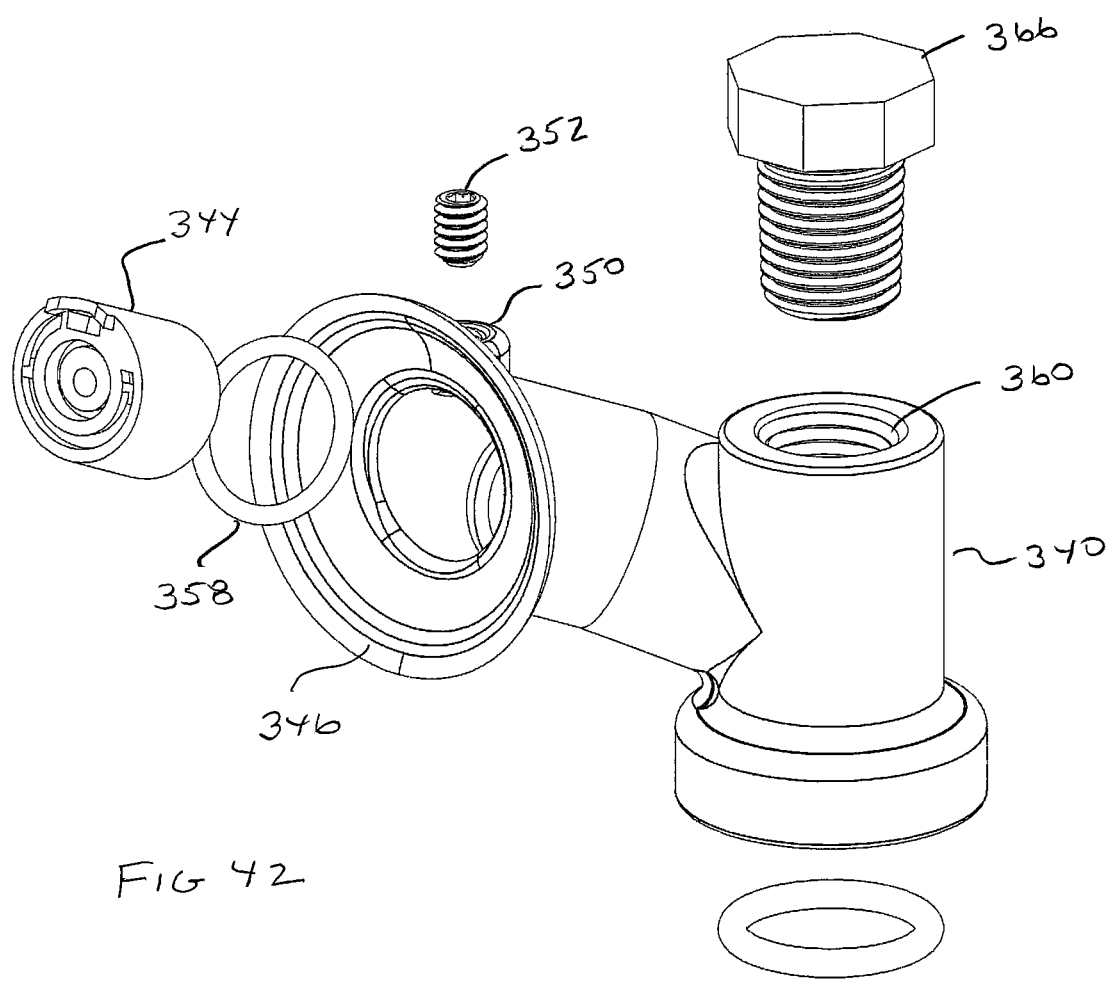
FIG. 42 is an exploded perspective side view of the exemplary distribution sprayer shown in FIG. 39.

In the alternative arrangement shown in FIGS. 39-43 the base 338 is also somewhat different than the base 140 previously described. While base 338 has many features which are the same as base 140, some different features are provided. For example, as represented in FIGS. 40-41 the land surface 368 which is in abutting relation with the outer thrust washer 370, is disposed further axially away from the outlet body end opening 372 and the outer seal 374 than in the arrangement of base 140. The arrangement of base 338 provides additional space for housing the lubricant fluid in the fluid tight jacket which provides the brake force. In addition in this exemplary arrangement the additional space helps to assure that the thrust bearing 376 which extends below the outer thrust washer 370, is immersed in the lubricating fluid.

The exemplary base 338 further includes an annular groove 378 that extends radially outwardly and in surrounding relation of the outer thrust washer. The annular groove 378 serves to hold lubricating fluid which helps to assure that the fluid acts on the thrust bearing and the adjacent thrust washers above and below the thrust bearing. Base 338 further includes a fluid fill opening 380. The fill opening 380 extends from outside the base 338 to the area of the annular groove 378 of the liquid tight jacket. The fill opening 380 enables adding lubricant material to the liquid tight jacket if necessary. During normal operation the fill opening is closed by a screw plug 382. Of course it should be understood that these features are exemplary and other embodiments different or alternative features to provide such functions may be used.

Figure 44:
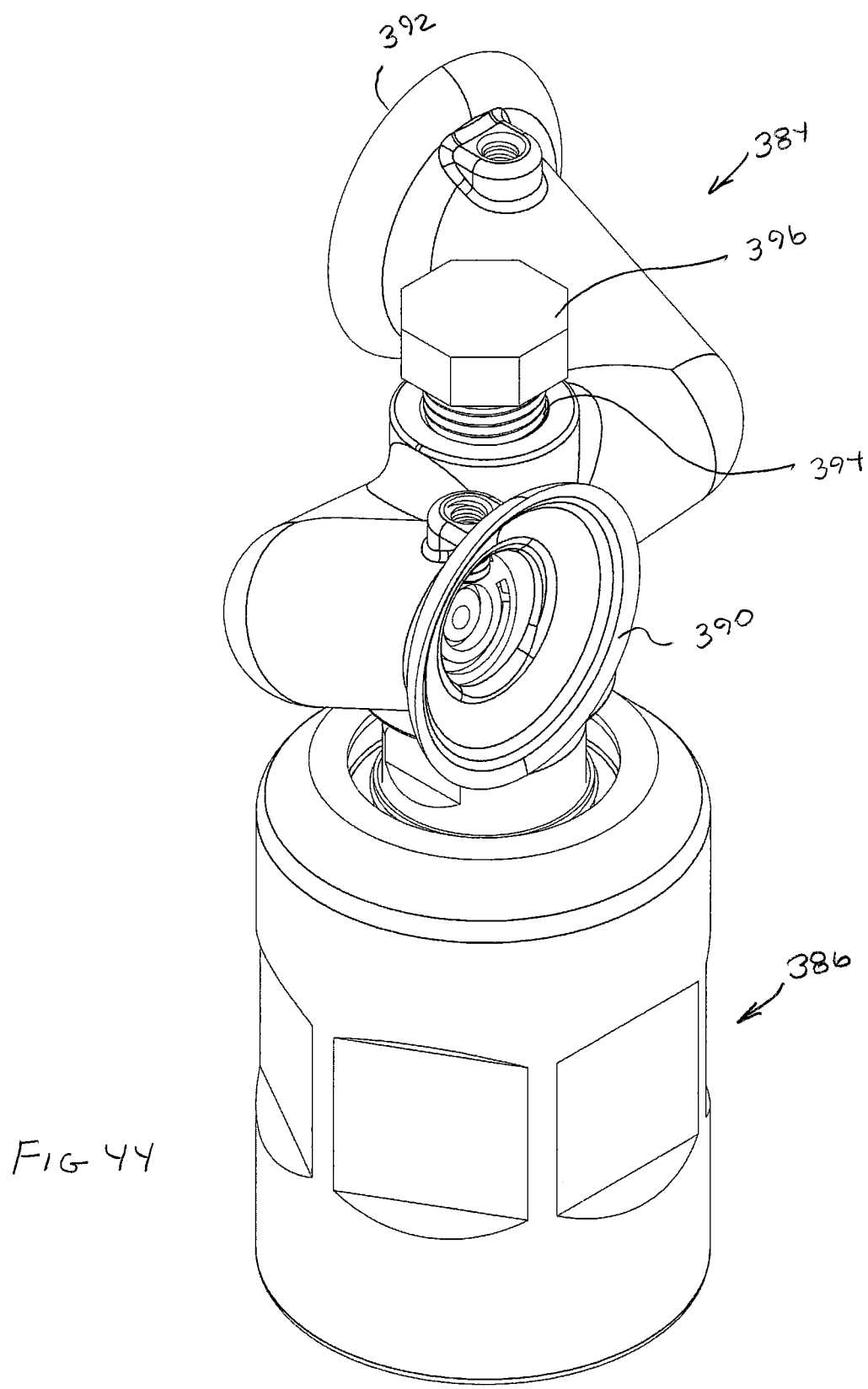
FIG. 44 is an isometric view of a further exemplary distribution sprayer with the manifold including a pair of alternative outlet nozzles.

FIG. 44 shows an alternative arrangement of a sprayer 384. Sprayer 384 includes a base 386 which may be the same as base 338 or base 140 previously described. Sprayer 384 includes a manifold 388. The exemplary manifold 38 is a dual nozzle manifold which is generally similar to manifold 262 that was described previously.

Manifold 388 includes a pair of deflection bells 390, 392 that are disposed outside the manifold interior area and that extend outward and radially away from a respective adjacent nozzle. Each of the deflector bells of manifold 388 may be similar to the deflector bell 346 described in connection with manifold 340. Of course it should be understood that alternative configurations of outward extending deflectors which operate to avoid liquid accumulating and running down the bottom of the manifold toward the base 386 may be used.

Further manifold 388 also includes an axially positioned port 394. Port 394 extends from outside the manifold to the manifold interior area similar to port 360 of manifold 340 previously discussed. The port 394 is configured to releasably receive therein a pressure indicator such as a pressure gauge which can be used for purposes of determining the pressure in the manifold. When not connected to a pressure indicator, the port 394 may be closed by a plug 396. Of course it should be understood that this configuration is exemplary and other embodiments other manifold configurations and arrangements may be utilized.

Figure 27:
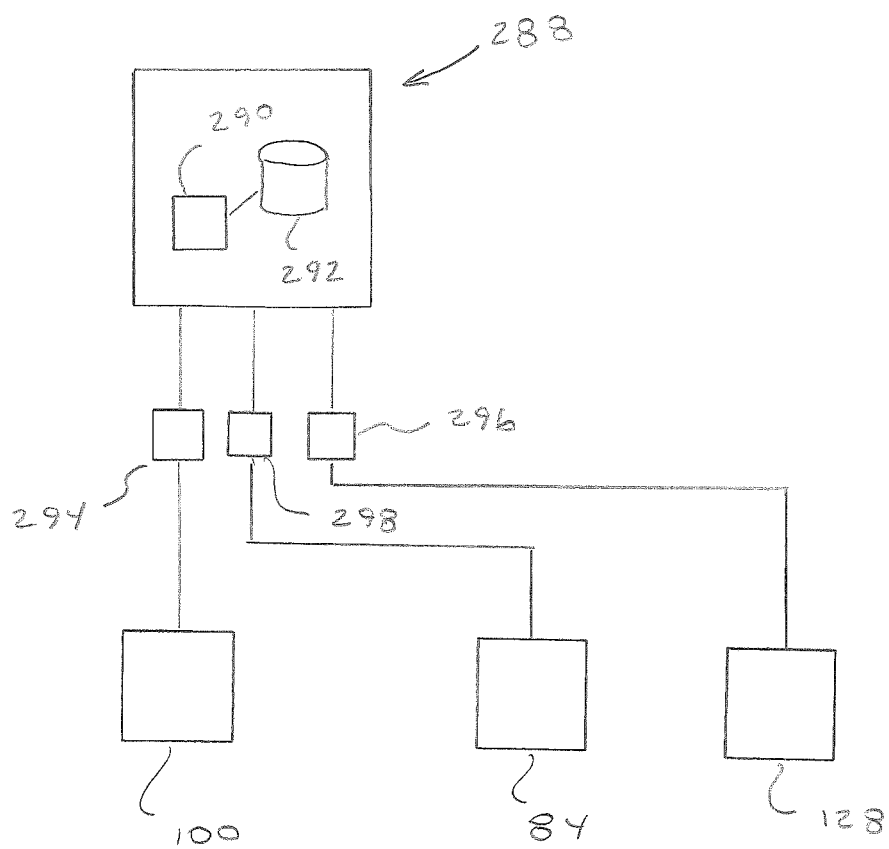
FIG. 27 is a schematic view of circuitry used in connection with an exemplary spray distribution apparatus.

FIG. 27 schematically shows circuitry associated with an exemplary embodiment of the wastewater spray distribution apparatus. It should be appreciated that the schematic representation is simplified for purposes of demonstrating the principles of operation. Further in some embodiments the circuitry shown will be integrated with circuitry associated with other devices that are part of the system.

In the exemplary arrangement control circuitry 288 is operative to control the pump and valves associated with the system. In the exemplary arrangement the control circuitry includes one or more circuits that are operative to communicate electrical signals with and control the operation of the devices connected in the system. In the exemplary arrangement the control circuitry 288 includes at least one circuit including a processor schematically indicated 290, and at least one data store schematically indicated 292. In exemplary arrangements the processor may include a processor suitable for carrying out circuit executable instructions that are stored in the one or more associated data stores. The processor includes or is in connection with a non-volatile storage medium including instructions that include a basic input/output system (BIOS). For example, processors may correspond to one or more of a combination of a CPU, FPGA, ASIC or any other integrated circuit or other type of circuit that is capable of processing data and instructions.

The data store or data stores may correspond to one or more of volatile or nonvolatile memories such as random-access memory, flash memory, magnetic memory, optical memory, solid-state memory or other devices that are operative to store circuit executable instructions and data. Circuit executable instructions may include instructions in any of a plurality of programming languages and formats, including without limitation, routines, subroutines, programs, scripts, threads of execution, objects, methodologies and functions which carry out the actions such as those described herein. Structures for processors may include, correspond to and utilize the principles described in the textbook entitled Microprocessor Architecture, Programming and Applications With The 8085, by Ramesh S. Gaonker (Prentice Hall 2002) which is incorporated herein by reference in its entirety.

In exemplary arrangements processors produced by Intel Corporation or Advanced Micro Devices may be used as part of the control circuitry. Of course it should be understood that these processes are exemplary of many different types of processors that may be used.

The exemplary data stores used in connection with the exemplary embodiments may include any one or more of several types of mediums suitable for holding circuit executable instructions. These may include, for example, magnetic media, optical media, solid-state media or other types of media such as RAM, ROM, PROM, flash memory, computer hard drives or any other form of non-transitory computer readable storage media suitable for holding data and circuit executable instructions. Exemplary control circuitry may further include other components such as hardware and/or software interfaces for communications with devices included in the system as well as external devices and systems.

In the exemplary arrangement the control circuitry is in operative connection with the one or more level sensors 100 previously discussed. As shown schematically, the level sensors are in communication with the control circuitry through one or more suitable interfaces 294. The drain valve 128 as well as other valves such as valves 138, 137, 133 and 131 are also in connection with the control circuitry. It should be understood that although only the drain valve 128 is schematically shown in FIG. 27, other valves which are part of the system and that are controlled to operate in coordinated relation by the control circuitry are in operative connection therewith. As represented in FIG. 27 the drain valve 128 is operatively connected to the control circuitry through an interface 296.

Also in operative connection with the control circuitry is the pump 84. The pump is in operative connection with control circuitry through an interface 298.

It should be understood that in some arrangements the pump may be of a type that operates at a single speed and has only either an on or off condition. In other exemplary arrangements the pump may be a variable speed pump which can be operated at different pressures and pumping rates responsive to operation of the control circuitry.

In some exemplary arrangements where the pump operates to provide almost immediate full speed operation, the exemplary sprayers 118, 260 may be particularly advantageous. This is because the exemplary brake 207 which includes the liquid in the liquid tight jacket, is operative to provide a rotational brake force which increases with increased rotational speed of the hub. This variation in the brake force provides a damping force that slows the rate of change in the rotational speed of the hub in the rotational direction in response to the thrust provided by the water that passes through the one or more outlet nozzles. This is because the liquid lubricant housed in the liquid tight jacket provides a brake resisting force that increases with speed to prevent rapid changes in rotational speed that might otherwise occur when the force of water quickly supplied by a pump initially rushes outward from the sprayer. Without such a rotational brake force that increases with speed being applied, the sprayer may begin rotating at a higher rate of speed than is desirable, which may correspond to a water distribution pattern that is not desired. Further without the application of the brake force the sprayer may continue to operate at an undesirable rated speed even after the pressure and flow forces from the water being delivered by the pump have stabilized. However it should be understood that brake 207 is exemplary and in other embodiments other types of brakes which provide fixed or variable brake force may be used.

Figure 28:
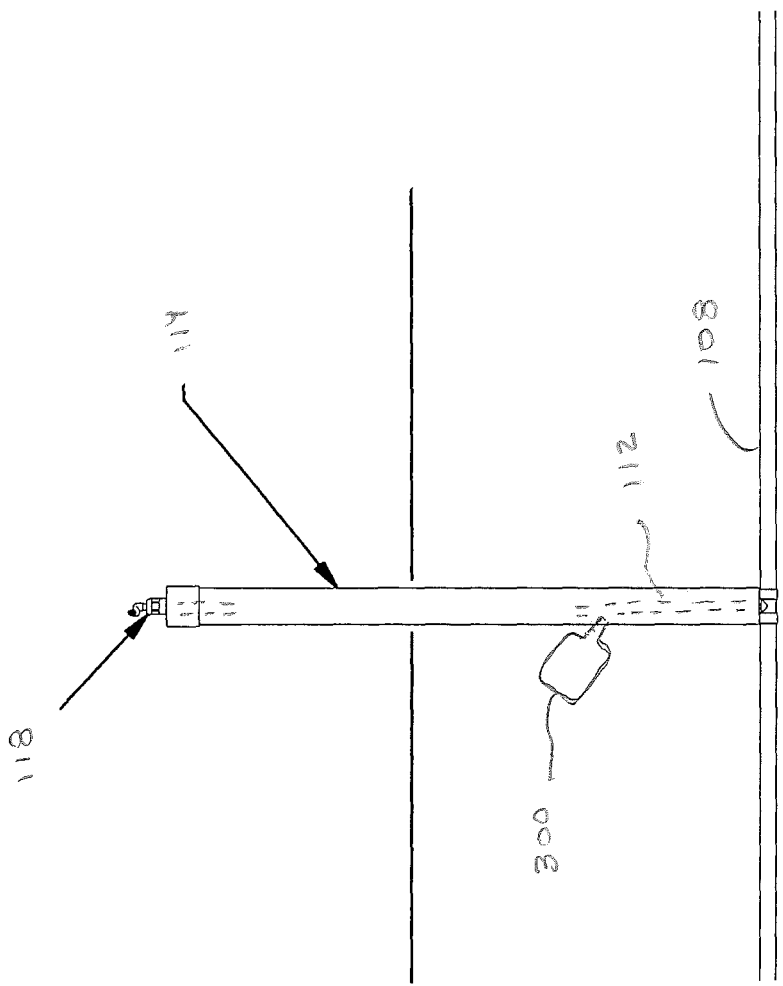
FIG. 28 is a schematic side view of an alternative vertically extending header pipe and sprayer, including an accumulator.

Further in some exemplary arrangements additional provisions may be made to reduce the risk that sprayers rotate at an improper speed. For example, an accumulator may be positioned in connection with the header pipe leading to the sprayer. The use of an accumulator in the line may reduce the effects of rapid changes in pressure forces that would otherwise be applied to the sprayer in response to pump startup. FIG. 28 is an arrangement similar to the previously discussed in FIG. 4. In FIG. 28 however an accumulator 300 has been fluidly connected to the header pipe 112 in the flow path in advance of the sprayer 118. In this exemplary arrangement if the control circuitry operates to start the pump at full speed, the accumulator 300 will absorb through expansion of an internal actuator chamber, a significant portion of the initial force of the leading interface of the water that passes upward through the header pipe toward the sprayer. The absorption of a significant portion of this initial pressure wave energy by the accumulator reduces the risk that the sprayer will react to the arrival of the water by beginning to rotate at an undesirable high rotational speed. This approach in combination with a brake, such as a brake that provides greater brake force with higher speed as provided by the liquid lubricant in the liquid tight jacket, further helps to assure that the exemplary sprayers will operate at the desired rotational speed and provide the desired water distribution pattern.

Figure 29:
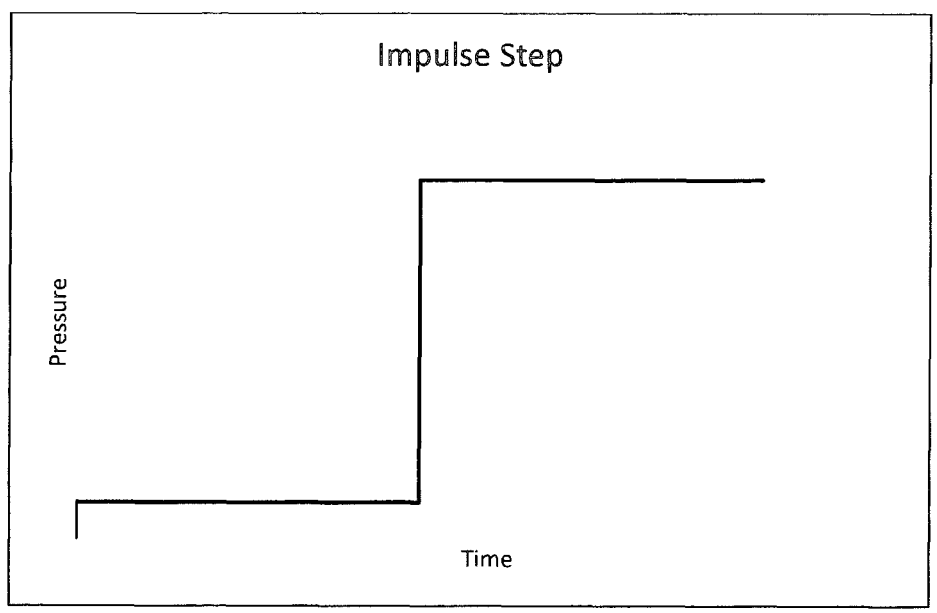
FIG. 29 is a graph representing how exemplary control circuitry associated with the spray distribution apparatus may control a pump to provide the delivery of water pressure versus time.

In other exemplary arrangements the control circuitry 288 may operate to control a variable speed pump which operates to pump the water from the water effluent tank 82. In some exemplary arrangements the circuit executable instructions associated with the control circuitry operate to cause the pump to provide pressure in accordance with the graph 302 shown in FIG. 29. In this exemplary arrangement when the controller receives a signal from the sensors 100 that water is to be discharged from the tank 82, the controller operates to close the drain valve 128 (if one is present in the system) and begin operation of the variable speed pump. In this arrangement the controller operates the pump in accordance with its stored circuit executable instructions to initially cause the pump to operate at a relatively low pressure. The low-pressure operation of the pump is continued for a set time considered sufficient to fill the lines of the water distribution system to the point of reaching to the sprayers. Once the pump operates at the initial low-pressure for the set time necessary to fill the lines, the controller causes the pump to increase its pressure to the normal pressure rate. Operating at the normal pressure and flow then causes the sprayers to begin to rotate against the brake force of the brake. The sprayers increase rotational speed as the brake force is overcome and eventually reaches a steady rotational speed based on the pressure and flow rate provided by the pump.

Once the sensors 100 detect that the water level within the tank 82 has fallen to a level at which pumping should be discontinued, the controller operates to cease supplying power to the pump 84 causing the cessation of pumping operation. When pump operation is stopped, in systems that do not include a drain valve 128 and a perforated distribution container 124, the water flows downward out of the manifold and the bases of the sprayers, and downwardly through the vertically extending header pipes back into the tank 82. In exemplary arrangements the piping is configured so that the level of the water remaining in the header pipes falls to a level below the frost line so as to assure that no freezing of the water will occur. Alternatively in systems that include a drain valve 128 and a perforated distribution container 124, the control circuitry 288 operates to cause the drain valve 128 to be opened when pump operation is stopped. This causes the water in the sprayers and the header pipes to be drained into the perforated distribution container 124. Also in such exemplary arrangements the level of the water falls to below the frost line so that no damage to the system due to freezing occurs.

Figure 30:
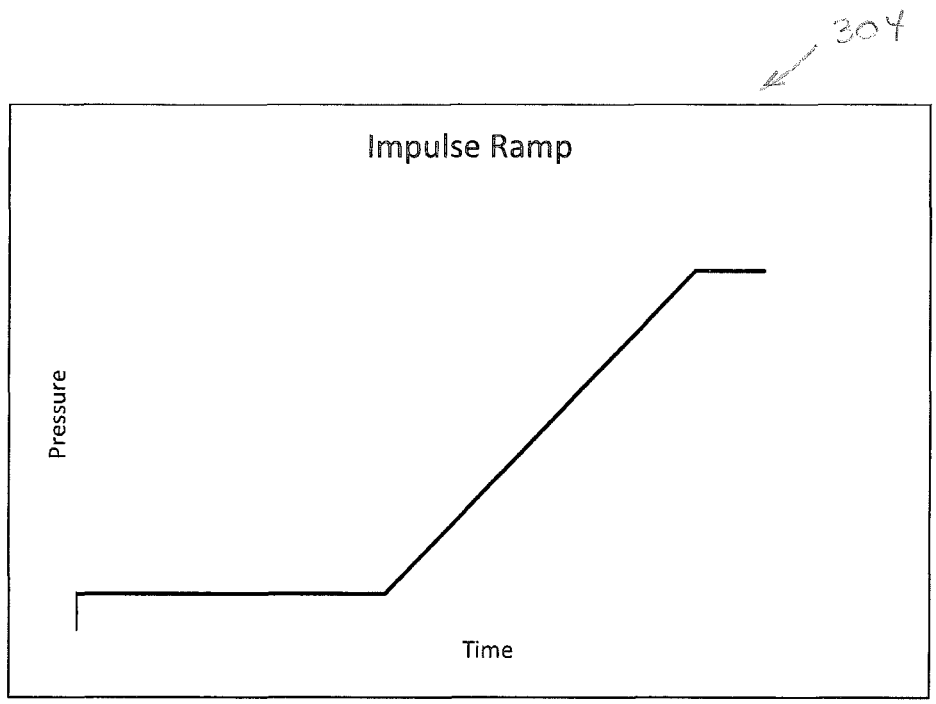
FIG. 30 is a further graph representing how exemplary control circuitry associated with the spray distribution apparatus may control a pump to provide the delivery of water pressure versus time.

FIG. 30 shows an alternative graph 304 corresponding to operation of a variable speed pump by exemplary control circuitry. In this exemplary arrangement the control circuitry again initiates operation of the pump responsive to the detection of the water level by the level sensors at a relatively low pressure. The low-pressure operation of the pump is continued for a programmed set time that is sufficient for purposes of filling the lines with water to the level of the sprayers. After the initial period of operation at the low-pressure level, the control circuitry operates to gradually increase the pressure supplied by the pump. The gradual increase continues until the full operating pressure and flow rate is achieved.

As can be appreciated, this exemplary arrangement gradually increases the flow through the spray heads so that the rotational speed of the manifold gradually increases toward the desired rotational speed which produces the desired water spray pattern. In this exemplary arrangement the brake force provided by the brake such as by the liquid in the liquid tight jacket further helps to assure that the rotational speed of the sprayers does not exceed the desired design speed. When the liquid level in the water tank falls in this exemplary control arrangement, the water again drains from the sprayers and the header pipes to below the frost line, either back to the tank or to the perforated distribution container depending on the configuration of the system. In other exemplary arrangements the control circuitry may operate to gradually increase the pump pressure and flow rate from the zero-pressure condition to the operating condition, without an initial timed period of operation at low pressure. Such an approach may also assure achieving desired sprayer water distribution. Of course it should be understood that these control arrangements are exemplary and in other embodiments other control arrangements may be used.

In some exemplary arrangements it is useful to be able to hold the hub 154 of an exemplary sprayer 118 in a rotationally fixed position. This may be helpful for purposes of holding the hub 154 and the nipple end 152 stationary so that a manifold, such as manifold 142 can be threaded into engagement thereto, or detached therefrom. It is also sometimes helpful to hold the hub with the attached manifold stationary so that outlet nozzles such as outlet nozzle 158 can be removed from or installed in connection with the manifold. It is also sometimes useful to be able to hold the hub 154 stationary for testing purposes. For example, an individual installing or testing the system may prefer that the hub and manifold not rotate while they test to determine if the spray pattern from the manifold is suitable for the location in which the sprayer 118 is installed. This can minimize the risk of the individual installing or testing the system getting wet while the spray pattern or pressure is observed and evaluated. In other situations it may be desirable to hold the hub 154 stationary so that the sprayer does not rotate. This may be desirable in certain situations where the manifold and spray nozzle is to distribute the water only into a selected fixed area of the ground surface. It may also be desirable to hold the hub stationary in other circumstances as well.

FIGS. 31 through 34 show a hub lock 306 used with the exemplary embodiment of the sprayer 118. The exemplary hub lock 306 has an integrally formed body 308. The exemplary body 308 may be comprised of plastic, metal or other suitable rigid or semi-rigid material. The exemplary body 308 includes a hub engaging upper yoke 310 and a body engaging lower yoke 312. The upper yoke and the lower yoke are connected through a connector portion 314 of the body.

The upper yoke 310 includes an upper yoke recess 316 therein. The upper yoke recess 316 is bounded on opposed lateral sides by a pair of side walls 318. The pair of side walls of the upper yoke are spaced apart a lateral distance so that they engage the wrench flats 156 on hub 154 in close fitting relation. The side walls 318 are configured so that when the flats 156 of the hub 154 are engaged with the side walls, the hub 154 cannot rotate in the recess 316.

The lower yoke 312 includes a lower yoke recess 320. The lower yoke recess 320 is bounded by a pair of laterally spaced side walls 324. The lower yoke side walls 324 are laterally spaced to engage the wrench flats 146 of the body 144 in close fitting relation. Side walls 324 are configured so that when the side walls are engaged with the wrench flats 146 of the body 144 the body cannot rotate within lower yoke recess 320.

The exemplary hub lock 306 further includes a locking lever 322. Locking lever 322 is rotationally movable about a pivot pin 326. The exemplary locking lever 322 includes a handle projection 328. The handle projection 328 extends outwardly from the front face of the locking lever. The handle projection 328 is configured to facilitate finger engagement for movement of the locking lever.

Figure 32:
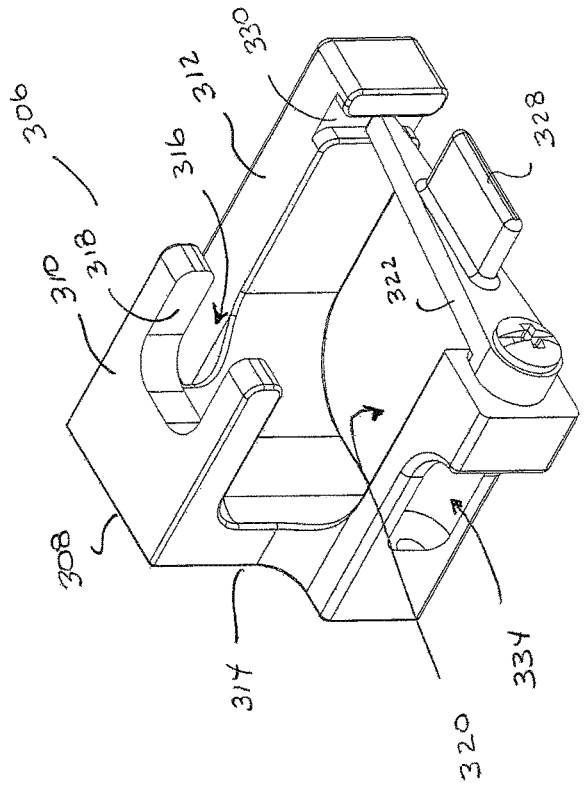
FIG. 32 is a view of the exemplary hub lock shown in FIG. 31 with the locking lever in a closed position.
Figures 33, 34:
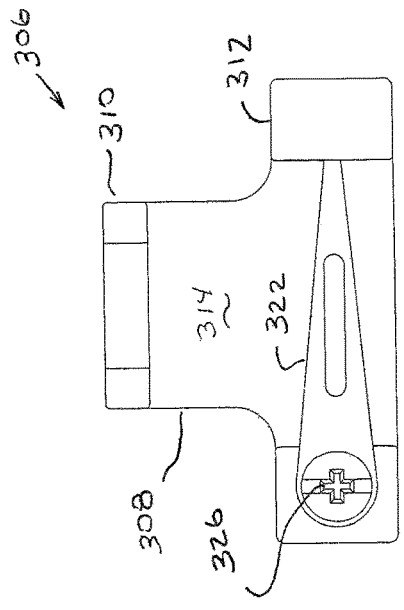
FIG. 33 is a front plan view of the hub lock with the locking lever in the open position.
FIG. 34 is a front plan view of the hub lock with the locking lever in the closed position.

In the exemplary arrangement the lower yoke includes a catch slot 330. The catch slot extends on the opposite side of the lower yoke from the pivot pin 326. The catch slot 330 is configured to receive a distal end 332 of the locking lever therein. As represented in FIGS. 31 through 34 the locking lever 322 is manually movable between an open position shown in FIGS. 31 and 33 in which the lower yoke recess 320 is accessible from the front of the hub lock 306, to a closed position shown in FIGS. 32 and 34 in which the lower yoke recess 320 is closed by the locking lever 322. As shown in FIGS. 32 and 34 in the closed position of the locking lever 322, the distal end 332 of the locking lever is engaged in the catch slot 330. The exemplary body also includes a recess 334 on one side of the lower yoke 312. The recess 334 of the exemplary arrangement provides access for a suitable fastener or other device that holds the pivot pin 326 in close fitting engagement with the body 308. In the exemplary arrangement the pivot pin 326 is configured so that when the locking lever 322 is manually rotated to a selected rotational position, the locking lever maintains the set position and is does not move therefrom due to gravity or forces other than deliberate manual movement. Of course this configuration is exemplary, and in other embodiments other structures and configurations may be used.

FIGS. 35 through 38 show the exemplary hub lock 306 in engagement with the exemplary sprayer 118. In the engaged position of the hub lock the sidewalls 318 of the upper yoke 310 are engagement with the wrench flats 156 on the hub 154. In the engaged position, the hub 154 extends in the upper yoke recess 316. The upper yoke extends vertically between the bottom of the manifold 142 which engages the nipple end 152 of the hub 154, and the outlet body end 148 of the body 144.

Figure 35:
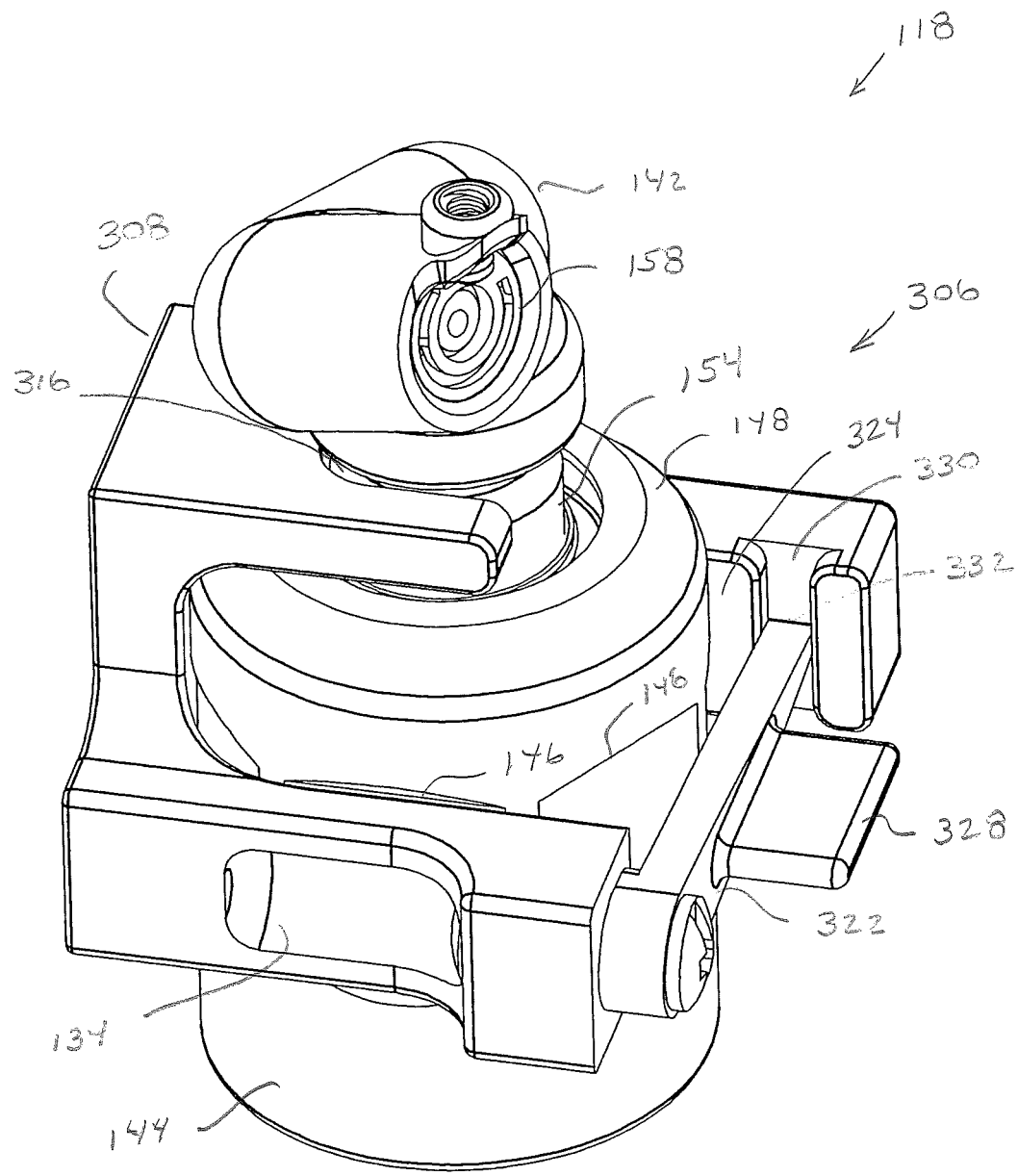
FIG. 35 is a right front top perspective view of the hub lock engaged with the exemplary sprayer.
Figure 36:
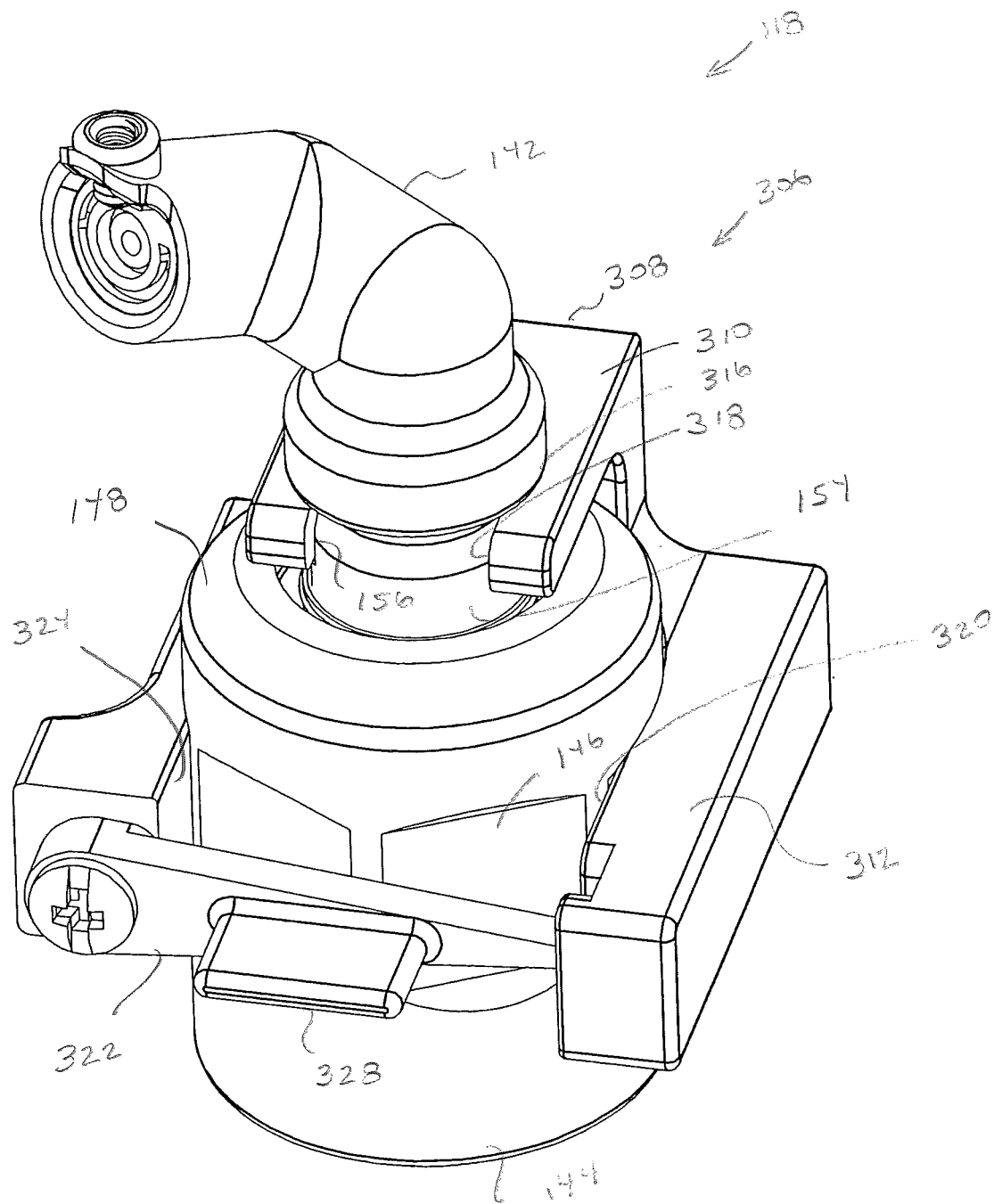
FIG. 36 is a left front top perspective view of the hub lock engaged with the exemplary sprayer.
Figure 37:
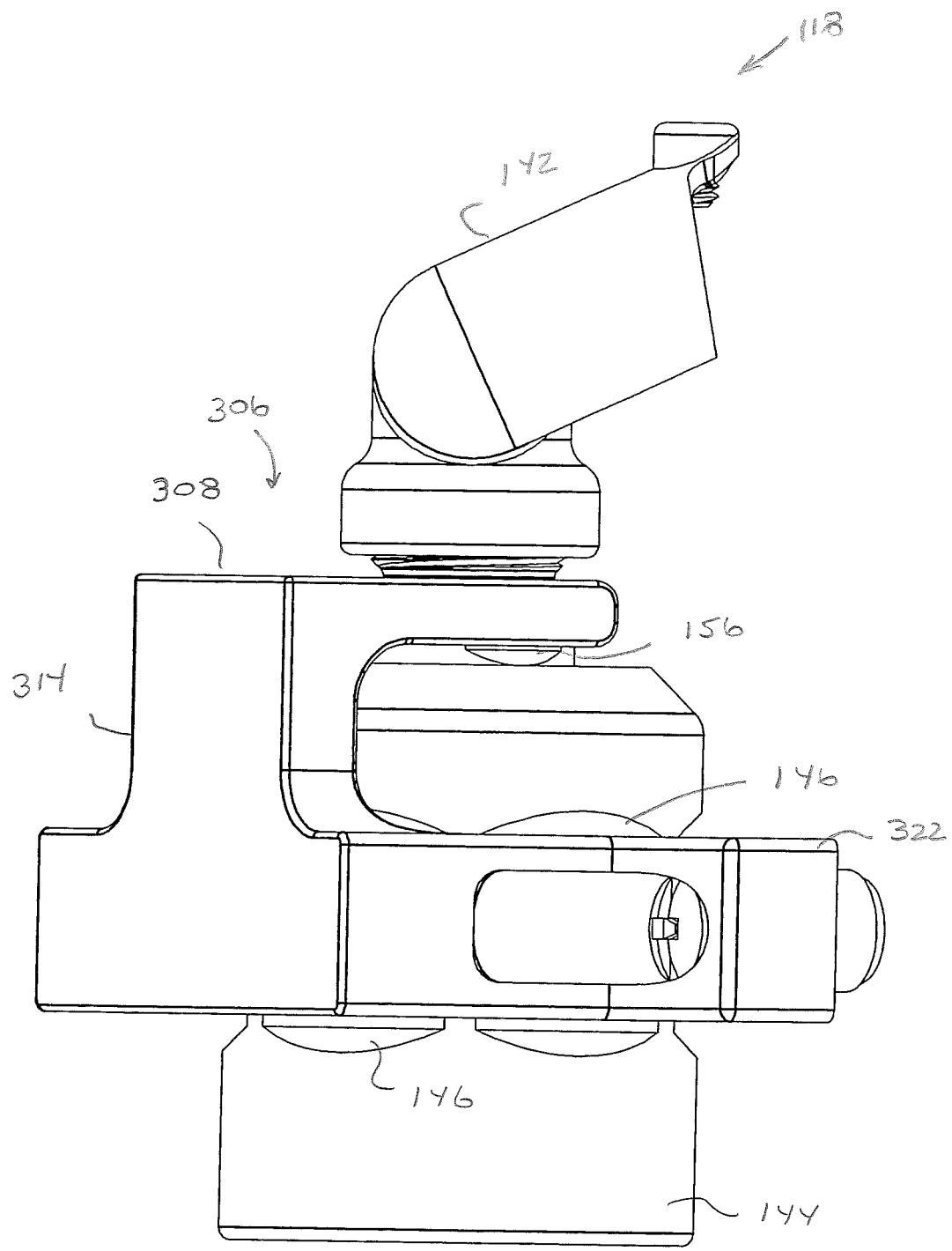
FIG. 37 is a right side view of the hub lock engaged with the exemplary sprayer.
Figure 38:
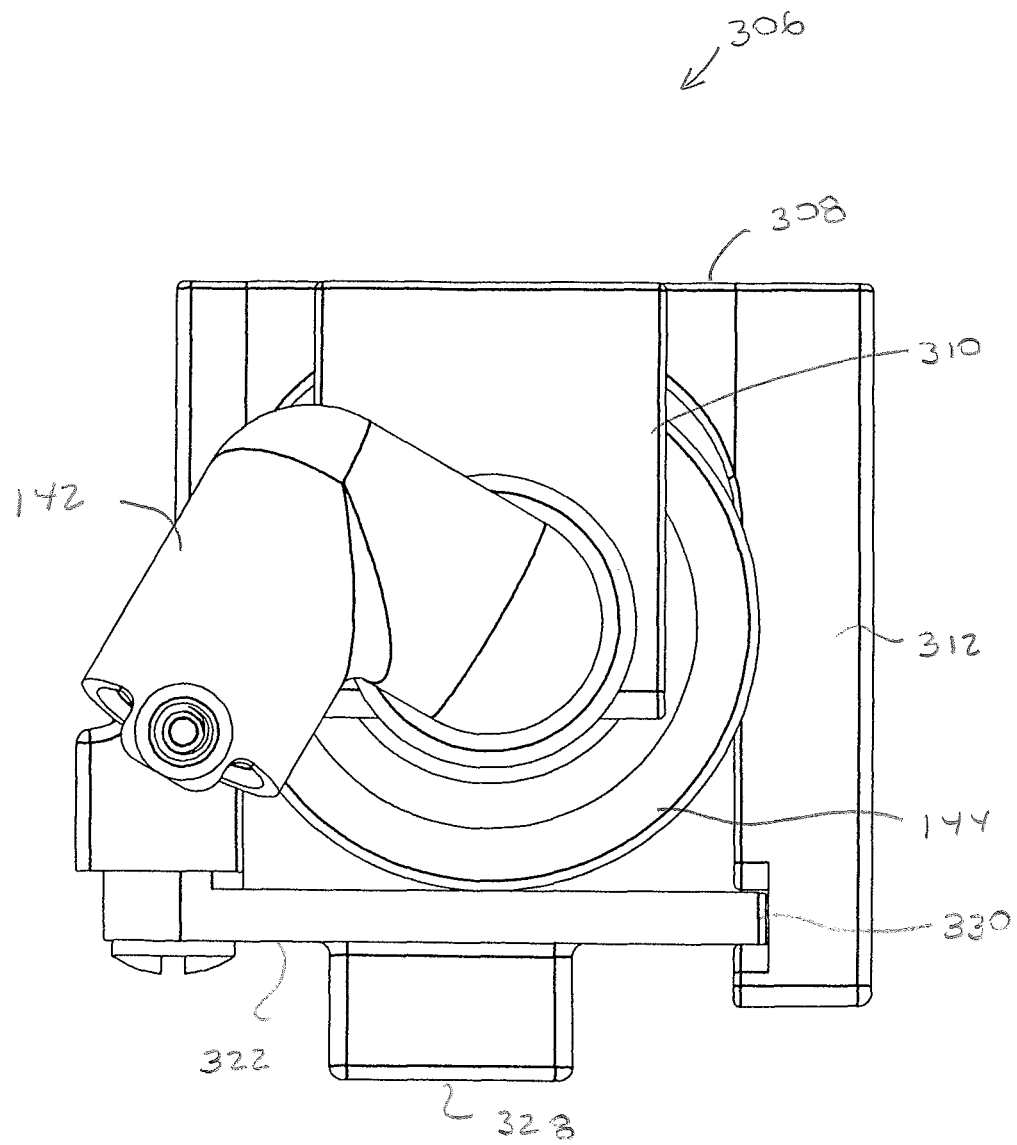
FIG. 38 is a top view of the hub lock engaged with the exemplary sprayer.

Also in the engaged position of the hub lock 306, the side walls 324 which bound the lower yoke recess 320 engage the wrench flats 146 on the body 144. As shown in FIG. 35 because the exemplary body 144 includes a plurality of angularly disposed wrench flats 146, the lower yoke 312 may be positioned in any of numerous angular positions which correspond to a pair of opposed wrench flats 146. This enables the exemplary hub lock 306 to be positioned in different selected angular positions in engagement with the body 144. This may be helpful in situations where access to the body is more readily accessible from one particular lateral side thereof. Of course it should be understood that this configuration is exemplary and in other embodiments other configurations may be used.

When the hub lock 306 is in engagement with the sprayer 118, the locking lever 322 is in the closed position. In this position the distal end 332 of the locking lever is in engagement with the catch slot 330. The positioning of the locking lever 322 in the closed position helps to hold the hub lock 306 in engagement with the sprayer 118. This is because in the closed position of the locking lever the inner face of the locking lever opposite the handle projection 328 is in close adjacent relation with the outer face of the body 144. As a result, of the exemplary hub lock cannot be disengaged from the sprayer by vibration or other forces that may act on the sprayer during work activity or testing.

With the hub lock 306 engaged with the exemplary sprayer as shown in FIGS. 35 through 38, and with the locking lever 322 in the closed position, the hub 154 is held stationary by the sidewalls 318 bounding the upper yoke recess 316. The hub lock 306 is further held stationary by the engagement of the sidewalls 324 of the lower yoke recess 320 with the wrench flats 146 on the body 144. In the engaged configuration and in the closed position of the locking lever 322, the hub lock 306 resists rotational forces that may otherwise be applied that would tend to rotate the hub 154. Such rotational forces may be associated with threadably engaging or disengaging manifold 142 or an alternative manifold with the hub. Such forces may also include forces associated with installing or removing the spray nozzle 158 from the manifold. Other rotational forces that are resisted are rotational thrust forces of water spraying from the nozzle or nozzles of the attached manifold during spray pattern or similar testing.

Figure 31:
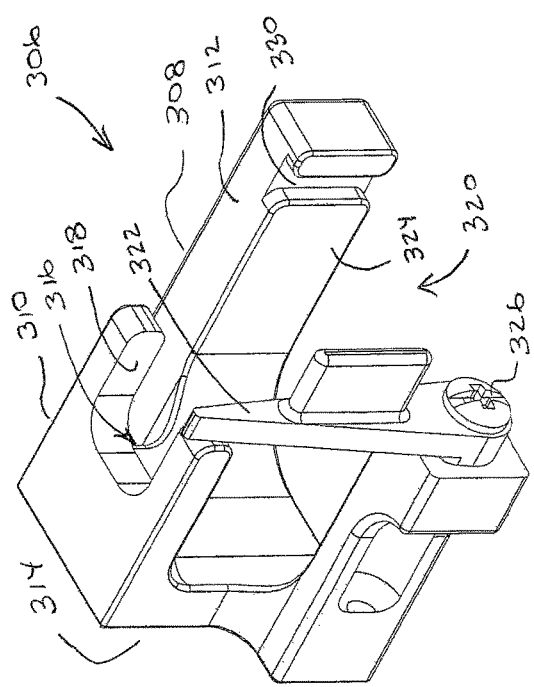
FIG. 31 is a perspective view of an exemplary hub lock used with the exemplary embodiment of the sprayer, with a locking lever in an open position.

In the exemplary arrangement when it is desired to remove the hub lock 306 from the sprayer, the locking lever 322 is rotated from the closed position shown in FIGS. 35 through 38 to the open position shown in FIGS. 31 and 33. With the locking lever 322 in the open position the hub lock 306 may be moved so that the hub 154 is no longer engaged in the upper yoke recess 316 and the body 144 is no longer engaged in the lower yoke recess 320. With the hub lock disengaged, the hub 154 and attached manifold 142 are free to rotate in the manner previously described. Of course it should be understood that these structures of the hub lock and the sprayer are exemplary and other embodiments alternative or different structures may be used.

It should also be understood that the water spray distribution apparatus and the components discussed as used in connection therewith as described herein are exemplary, and in other systems and arrangements other or different types of components may be used. Further, while the exemplary sprayers are described as being used in connection with the distribution of wastewater produced by a sewage treatment system, the features, structures and relationships associated with the embodiments of the sprayers described herein may be used in connection with other types of sprayers and systems as well as in connection with the spraying of materials other than water.

Thus the exemplary embodiments achieve improved operational capabilities, eliminate difficulties encountered in the use of prior devices and systems, and achieve the useful results described herein.

In the foregoing description certain terms have been used for brevity, clarity and understanding. However, no unnecessary limitations are to be implied therefrom because such terms are used for descriptive purposes and are intended to be broadly construed. Moreover the descriptions and illustrations herein are by way of examples and the new and useful features are not limited to the exact features shown or described herein.

It should further be understood that the features and/or relationships associated with one embodiment described herein can be combined with features and/or relationships from another embodiment. That is, various features and/or relationships from various embodiments can be combined in further embodiments. The inventive scope of the disclosure is not limited to only the embodiments shown and/or described herein.

Having described the features, discoveries and principles of the exemplary embodiments, the manner in which they are constructed and operated, and the advantages and useful results attained, the new and useful features, devices, elements, arrangements, parts, combinations, systems, equipment, operations, methods, processes and relationships are set forth in the appended claims.

I claim:

1. Apparatus comprising:
   a rotatable water distribution sprayer base configured to be in operation with a rotatable manifold,
   wherein the manifold includes
     a manifold interior area,
     a manifold inlet,
     at least one outlet nozzle,
       wherein the manifold inlet and the at least one outlet nozzle are in fluid communication through the manifold interior area,
   wherein the base includes
     a body,
       wherein the body includes an internal cavity,
         wherein the cavity extends along an axis,
       wherein the body includes an outlet body end,
         wherein the outlet body end includes an outlet body end opening,
     a hub,
       wherein the hub extends in the cavity and is rotatable about the axis within the cavity,
       wherein the hub includes a nipple end, wherein the nipple end
         extends axially and is accessible from outside the body at the outlet body end, and is releasably engageable with the manifold inlet,
       wherein the hub includes a fluid passage therethrough,
       wherein the fluid passage extends axially and between the cavity and the nipple end,
     a brake,
       wherein the brake is in operative connection with the hub within the body and is operative to apply a brake force that resists rotation of the hub in a first rotational direction,
   wherein water discharge from the at least one nozzle is operative to produce a rotational force operative to overcome the brake force and cause the hub and manifold to rotate in the first rotational direction.

2. The apparatus according to claim 1
   wherein the brake includes
     an annular liquid tight jacket,
       wherein the jacket extends in surrounding relation of the hub within the cavity,
     wherein the jacket includes a liquid other than water,
   wherein the liquid in the jacket causes the brake to increase the brake force with rotational speed of the hub in the first rotational direction.

3. The apparatus according to claim 1, and further comprising:
   the manifold,
   wherein the manifold includes at least one nozzle aperture,
   wherein a respective outlet nozzle is removably positioned in a respective nozzle aperture,
   wherein each outlet nozzle is disposed a radial distance from the axis.

4. The apparatus according to claim 1, and further comprising:
   the manifold,
   wherein the manifold includes at least one nozzle aperture,
   wherein a respective outlet nozzle is removably positioned in a respective nozzle aperture,
   wherein each outlet nozzle is disposed a radial distance from the axis,
   wherein the manifold further includes at least one nozzle fastener opening, wherein each nozzle fastener opening is adjacent to a respective nozzle aperture, at least one nozzle fastener, wherein each nozzle fastener extends in a respective nozzle fastener opening, wherein each nozzle fastener is movable to releasably engage a respective outlet nozzle and is operative to hold the respective outlet nozzle within the respective nozzle aperture.

5. The apparatus according to claim 1, and further comprising:

the manifold, wherein the manifold includes at least one nozzle aperture, wherein a respective outlet nozzle is removably positioned in a respective nozzle aperture, wherein each outlet nozzle is disposed a radial distance from the axis, wherein the manifold further includes at least one brow projection, wherein each brow projection extends outward from the manifold adjacent to a respective nozzle aperture, at least one nozzle fastener opening, wherein each nozzle fastener opening extends in a respective brow projection adjacent to a respective nozzle aperture, at least one nozzle fastener, wherein each nozzle fastener extends in a respective nozzle fastener opening, wherein each outlet nozzle includes an outward extending nozzle projection, wherein each nozzle projection includes a nozzle recess, wherein each nozzle fastener is movable to releasably engage a respective nozzle recess and is operative to hold the respective outlet nozzle within the respective nozzle aperture.

6. The apparatus according to claim 1, and further comprising:

the manifold, wherein the at least one outlet nozzle is disposed from the axis a radial distance, wherein the interior area is bounded by a lower manifold surface between the manifold inlet and each outlet nozzle, wherein when the axis extends vertically, the lower manifold surface is sloped downward continuously between each outlet nozzle and the manifold inlet.

7. The apparatus according to claim 1, and further comprising:

the manifold, wherein the manifold includes at least one nozzle aperture, and at least one outward extending deflector projection that extends outside the manifold interior area and away from and below a respective nozzle aperture, wherein each outlet nozzle is disposed a radial distance from the axis.

8. The apparatus according to claim 1, and further comprising:

the manifold, wherein the manifold includes at least one nozzle aperture and at least one outward extending annular deflector bell that extends outside the manifold interior area and away from a respective nozzle aperture, wherein each outlet nozzle is disposed a radial distance from the axis.

9. The apparatus according to claim 1, and further comprising:

the manifold, wherein the manifold includes at least one nozzle aperture, wherein a respective outlet nozzle is removably positioned in a respective nozzle aperture, wherein each outlet nozzle is disposed a radial distance from the axis, wherein the manifold further includes at least one outward extending annular deflector bell, wherein each deflector bell extends outward from the manifold adjacent to a respective nozzle aperture, wherein each deflector bell includes a brow portion, at least one nozzle fastener opening, wherein each nozzle fastener opening extends in a respective brow portion adjacent to a respective nozzle aperture, at least one nozzle fastener, wherein each nozzle fastener extends in a respective nozzle fastener opening, wherein each outlet nozzle includes an outward extending nozzle projection, wherein each nozzle projection includes a nozzle recess, wherein each nozzle fastener is movable to releasably engage a respective outlet nozzle recess and is operative to hold the respective nozzle within the respective nozzle aperture.

10. The apparatus according to claim 1, and further comprising:

the manifold, wherein the at least one outlet nozzle is disposed from the axis a radial distance, wherein the interior area is bounded by a lower manifold surface between the manifold inlet and each outlet nozzle, wherein when the axis extends vertically, the lower manifold surface is sloped downward continuously between each outlet nozzle and the manifold inlet, wherein the manifold further includes an axially positioned port, wherein the axially positioned port extends from outside the manifold to the manifold interior area, wherein the axially positioned port is configured to releasibly receive a pressure indicator therein.

11. The apparatus according to claim 1 wherein the brake includes an annular liquid tight jacket, wherein the jacket extends in surrounding relation of the hub within the cavity, wherein the jacket includes a liquid other than water, wherein the liquid in the jacket causes the brake to increase the brake force with increased rotation speed of the hub in the first rotational direction, wherein the cavity includes adjacent to the outlet body end of the body, an annular land surface, wherein the annular land surface is disposed axially inwardly of the outlet body end opening, wherein the hub includes an annular flange portion, wherein the annular flange portion is in axially opposed relation of the annular land surface within the cavity, wherein the annular flange portion and the annular land surface are within the liquid tight jacket, wherein the annular land surface is operatively engaged with the annular flange portion, whereby such operative engagement prevents the hub from extending axially outward from the outlet body end opening beyond a hub operative position.

12. The apparatus according to claim 1 wherein the brake includes an annular liquid tight jacket, wherein the jacket extends in surrounding relation of the hub within the cavity,
wherein the jacket includes a liquid other than water,
wherein the liquid in the jacket causes the brake to increase the brake force with increased rotation speed of the hub in the first rotational direction,
wherein the cavity includes adjacent to the outlet body end of the body, an annular land surface, wherein the annular land surface is disposed axially inwardly of the outlet body end opening,
wherein the hub includes an annular flange portion, wherein the annular flange portion is in axially opposed relation of the annular land surface within the cavity,
at least one thrust washer axially intermediate of the annular land surface and the annular flange portion,
wherein the annular flange portion, the annular land surface and the at least one thrust washer are within the liquid tight jacket,
wherein the at least one thrust washer is operatively engaged with the annular land surface and the annular flange portion, whereby such operative engagement prevents the hub from extending axially outward from the outlet body end opening beyond a hub operative position.

13. The apparatus according to claim 1
wherein the brake includes
an annular liquid tight jacket,
wherein the jacket extends in surrounding relation of the hub within the cavity,
wherein the jacket includes a liquid other than water,
wherein the liquid in the jacket causes the brake to increase the brake force with increased rotation speed of the hub in the first rotational direction,
wherein the cavity includes adjacent to the outlet body end of the body, an annular land surface, wherein the annular land surface is disposed axially inwardly of the outlet body end opening,
wherein the hub includes an annular flange portion, wherein the annular flange portion is in opposed relation of the annular land surface within the cavity,
a pair of thrust washers axially intermediate of the annular land surface and the annular flange portion,
a needle roller thrust bearing axially intermediate of the pair of thrust washers,
wherein the pair of thrust washers, the needle roller thrust bearing, the annular flange portion and the annular land surface are within the liquid tight jacket,
wherein a respective one of the pair of thrust washers is operatively engaged with a respective one of the annular land surface and the other of the pair of thrust washers is operatively engaged with the annular flange portion, whereby such operative engagement prevents the hub from extending axially outward from the outlet body end opening beyond a hub operative position.

14. The apparatus according to claim 1
wherein the brake includes
an annular liquid tight jacket,
wherein the jacket extends in surrounding relation of the hub within the cavity,
wherein the jacket includes a liquid other than water,
wherein the liquid in the jacket causes the brake to increase the brake force with increased rotation speed of the hub in the first rotational direction,
wherein the hub includes a radially outward extending annular step within the cavity,
an annular bearing, wherein the annular bearing extends in surrounding relation of the hub within the cavity and is in abutting relation with the annular step,
wherein the annular step and the annular bearing are within the liquid tight jacket.

15. The apparatus according to claim 1
wherein the brake includes
an annular liquid tight jacket,
wherein the jacket extends in surrounding relation of the hub within the cavity,
wherein the jacket includes a liquid other than water,
wherein the liquid in the jacket causes the brake to increase the brake force with increased rotation speed of the hub in the first rotational direction,
wherein the hub includes a radially outward extending annular step within the cavity,
an annular needle bearing, wherein the bearing extends in surrounding relation of the hub within the cavity and is in abutting relation with the annular step,
wherein the annular step and the bearing are within the liquid tight jacket.

16. The apparatus according to claim 1
wherein the brake includes
an annular liquid tight jacket,
wherein the jacket extends in surrounding relation of the hub within the cavity,
wherein the jacket includes a liquid other than water,
wherein the liquid in the jacket causes the brake to increase the brake force with increased rotation speed of the hub in the first rotational direction,
wherein the body includes
an annular outer seal recess within the body and adjacent to the outlet body end opening,
wherein an annular radially inward extending body lip axially outwardly overlies the outer seal recess,
and further including
an outer seal, wherein the outer seal includes a rigid ring portion and an annular radially inward extending resilient portion that extends radially inwardly from the ring portion,
wherein the rigid ring portion extends in the outer seal recess, and the annular resilient portion is in annular sealing engagement with the nipple end of the hub, wherein the outer seal is operative to seal an axial end of the liquid tight jacket.

17. The apparatus according to claim 1
wherein the brake includes
an annular liquid tight jacket,
wherein the jacket extends in surrounding relation of the hub within the cavity,
wherein the jacket includes a liquid other than water,
wherein the liquid in the jacket causes the brake to increase the brake force with increased rotation speed of the hub in the first rotational direction,
wherein the body includes
an annular outer seal recess within the body and adjacent to the outlet body end opening,
wherein an annular radially inward extending body lip axially outwardly overlies the outer seal recess,
and further including
an outer seal, wherein the outer seal includes a rigid ring portion and an annular radially inward extending resilient portion, that extends radially inwardly from the ring portion,
wherein the rigid ring portion extends in the outer seal recess, and wherein the annular resilient portion is in annular sealing engagement with the nipple end of the hub, wherein the outer seal is operative to seal an axial end of the liquid tight jacket,
wherein in transverse cross-section the annular resilient portion includes an axially outwardly extending flexible lip, wherein the flexible lip annularly engages the nipple end, and
wherein the flexible lip is configured so that increasing external pressure outside the body urges the flexible lip to move to more tightly engage the nipple end.

18. The apparatus according to claim 1
wherein the brake includes
an annular liquid tight jacket,
wherein the jacket extends in surrounding relation of the hub within the cavity,
wherein the jacket includes a liquid other than water,
wherein the liquid in the jacket causes the brake to increase the brake force with increased rotation speed of the hub in the first rotational direction,
wherein the hub includes
a radially inward extending annular flange portion,
a reduced diameter annular portion axially extending from the inward extending annular flange portion at an end of the hub axially opposite the nipple end,
wherein the internal cavity is bounded by an annular seal engaging surface that extends in surrounding relation of the reduced diameter portion,
and further including
an inner seal,
wherein the inner seal includes
a rigid ring portion, and
a resilient annular portion extending radially inward of the ring portion,
wherein the rigid ring portion of the seal is engaged with the annular seal engaging surface and the radially inward extending resilient portion is in annular sealing engagement with the reduced diameter portion, whereby the inner seal is operative to seal an axial end of the liquid tight jacket.

19. The apparatus according to claim 1
wherein the brake includes
an annular liquid tight jacket,
wherein the jacket extends in surrounding relation of the hub within the cavity,
wherein the jacket includes a liquid other than water,
wherein the liquid in the jacket causes the brake to increase the brake force with increased rotation speed of the hub in the first rotational direction,
wherein the hub includes
a radially inward extending annular flange portion,
a reduced diameter annular portion axially extending from the inward extending annular flange portion at an end of the hub axially opposite the nipple end,
wherein the internal cavity is bounded by an annular seal engaging surface that extends in surrounding relation of the reduced diameter portion,
and further including
an inner seal,
wherein the inner seal includes
a rigid ring portion, and
a resilient portion extending radially inward of the ring portion,
wherein the rigid ring portion of the inner seal is engaged with the annular seal engaging surface and the radially inward extending resilient portion is in annular sealing engagement with the reduced diameter portion, whereby the inner seal is operative to seal an axial end of the liquid tight jacket, and
wherein the radially inward extending annular flange portion rotatably moves in operatively supported engagement with the ring portion.

20. The apparatus according to claim 1
wherein the brake includes
an annular liquid tight jacket,
wherein the jacket extends in surrounding relation of the hub within the cavity,
wherein the jacket includes a liquid other than water,
wherein the liquid in the jacket causes the brake to increase the brake force with increased rotation speed of the hub in the first rotational direction,
wherein the hub includes
a radially inward extending annular flange portion,
a reduced diameter annular portion axially extending from the inward extending annular flange portion at an end of the hub axially opposite the nipple end,
wherein the internal cavity is bounded by an annular seal engaging surface that extends in surrounding relation of the reduced diameter portion,
and further including
an inner seal,
wherein the inner seal includes
a rigid ring portion, and
a resilient portion extending radially inward of the ring portion,
wherein the rigid ring portion of the seal is engaged with the annular seal engaging surface and the radially inward extending resilient portion is in annular sealing engagement with the reduced diameter portion, whereby the inner seal is operative to seal an axial end of the liquid tight jacket, and
wherein the radially inward extending annular flange portion is movable in operatively supported engagement with the ring portion, and
wherein in transverse cross-section the radially inward extending resilient portion includes a flexible axially outward extending lip, wherein increased liquid pressure in the cavity is operative to cause increased sealing force of the flexible lip against the reduced diameter portion.

21. The apparatus according claim 1
wherein the body includes a mounting opening at an end axially opposed of the outlet body end opening,
wherein the mounting opening is internally threaded and fluidly connected with the cavity.

22. The apparatus according to claim 1
and further including
the manifold,
a vertically extending header pipe, wherein the vertically extending header pipe is fluidly connected with the cavity,
a sewage treatment water effluent tank, wherein the effluent tank extends below ground level below of a frost line, wherein the vertically extending header pipe is fluidly connected to the effluent tank,
wherein the manifold extends above ground level and the header pipe extends continuously vertically from the base to below ground level and to below the frost line.

23. The apparatus according to claim 1
and further including
the manifold,
a vertically extending header pipe, wherein the vertically extending header pipe is fluidly connected with the cavity,
a sewage treatment water effluent tank, wherein the effluent tank extends below ground level below a frost line, wherein the vertically extending header pipe is fluidly connected to the effluent tank,
wherein the manifold extends above ground level and the header pipe extends continuously vertically from the base to below ground level and to below the frost line,
a pump, wherein the pump is fluidly connected to the effluent tank and the header pipe, wherein the pump is operative to pump water from the effluent tank to the sprayer base,
a control circuit, wherein the control circuit is in operative connection with the pump,
wherein the control circuit is operative to control the pump to begin pumping water from the effluent tank toward the sprayer base at an initial relatively low pressure for a set period of time sufficient for water to reach the sprayer base and then to gradually increase the pressure to a final pressure and flow rate,
wherein the water discharging from the at least one outlet nozzle is operative to gradually continuously increase rotational speed of the manifold and hub from a zero initial rotational speed to an operating rotational speed.

24. The apparatus according to claim 1
and further including
the manifold,
a vertically extending header pipe, wherein the vertically extending header pipe is fluidly connected with the cavity,
a sewage treatment water effluent tank, wherein the effluent tank extends below ground level below a frost line, wherein the vertically extending header pipe is fluidly connected to the effluent tank,
wherein the manifold extends above ground level and the header pipe extends continuously vertically from the base to below ground level and to below the frost line,
a pump, wherein the pump is fluidly connected to the effluent tank and the header pipe, wherein the pump is operative to pump water from the effluent tank to the sprayer base,
a control circuit, wherein the control circuit is in operative connection with the pump,
wherein the control circuit is operative to control the pump to begin pumping water from the effluent tank toward the sprayer base at an initial low pressure for a set period of time sufficient for water to reach the sprayer base and then to gradually increase the pressure to a final pressure and flow rate,
wherein the water discharging from the at least one outlet nozzle is operative to gradually continuously increase rotational speed of the manifold and hub from a zero initial rotational speed to an operating rotational speed,
and wherein the control circuit is operative to control the pump to cease pumping water from the effluent tank towards the sprayer base, wherein all water within the base and the header pipe is vertically drained through the header pipe to below the frost line.

25. The apparatus according to claim 1, and further comprising:
the manifold,
wherein the at least one outlet nozzle is disposed from the axis a radial distance,
wherein the interior area is bounded by a lower manifold surface between the manifold inlet and each outlet nozzle,
wherein when the axis extends vertically, each lower manifold surface is sloped downward continuously between each outlet nozzle and the manifold inlet,
and further including
a vertically extending header pipe, wherein the vertically extending header pipe is fluidly connected with the cavity,
a sewage treatment water effluent tank, wherein the effluent tank extends below ground level below a frost line, wherein the vertically extending header pipe is fluidly connected to the effluent tank,
wherein the manifold extends above ground level and the header pipe extends continuously vertically from the base to below ground level and to below the frost line,
a pump, wherein the pump is fluidly connected to the effluent tank and the header pipe, wherein the pump is operative to pump water from the effluent tank to the sprayer base,
a control circuit, wherein the control circuit is in operative connection with the pump,
wherein the control circuit is operative to control the pump to begin pumping water from the effluent tank toward the sprayer base at an initial relatively low pressure and then to gradually increase the pressure to a final pressure and flow rate,
wherein the water discharging from the at least one outlet nozzle is operative to gradually continuously increase rotational speed of the manifold and hub from a zero initial rotational speed to an operating rotational speed,
and wherein the control circuit is operative to control the pump to cease pumping water from the effluent tank towards the sprayer base, wherein all water within the manifold, the base and the header pipe is vertically drained through the header pipe to below the frost line.

26. The apparatus according to claim 1, and further comprising:
the manifold,
wherein the at least one outlet nozzle is disposed from the axis a radial distance,
wherein the interior area is bounded by a lower manifold surface between the manifold inlet and each outlet nozzle,
wherein when the axis extends vertically, each lower manifold surface is sloped downward continuously between each outlet nozzle and the manifold inlet,
and further including
a vertically extending header pipe, wherein the vertically extending header pipe is fluidly connected with the cavity,
a sewage treatment water effluent tank, wherein the effluent tank extends below ground level below a frost line, wherein the vertically extending header pipe is fluidly connected to the effluent tank,
wherein the manifold extends above ground level and the header pipe extends continuously vertically from the base to below ground level and to below the frost line,
a pump, wherein the pump is fluidly connected to the effluent tank and the header pipe, wherein the pump is operative to pump water from the effluent tank to the sprayer base,
a control circuit, wherein the control circuit is in operative connection with the pump,
a perforated distribution container, wherein the perforated distribution container is below ground level and below the frost line, wherein the header pipe is fluidly connected with the perforated distribution container,
wherein the control circuit is operative to control the pump to begin pumping water from the effluent tank toward the sprayer base at an initial relatively low flow rate and to gradually increase the flow rate to a final flow rate, wherein the water discharging from the at least one outlet nozzle is operative to gradually continuously increase rotational speed of the manifold and hub from a zero initial rotational speed to an operating rotational speed, and wherein the control circuit is further operative to control the pump to cease pumping water from the effluent tank towards the sprayer base, wherein water within the manifold, the base and the header pipe is vertically drained through the header pipe to the perforated distribution container below the frost line.

27. The apparatus according to claim 1, and further comprising:

the manifold, wherein the at least one outlet nozzle is disposed from the axis a radial distance, wherein an outward extending annular deflector bell extends outwardly of each outlet nozzle, wherein the interior area is bounded by a lower manifold surface between the manifold inlet and each outlet nozzle, wherein when the axis extends vertically, each lower manifold surface is sloped downward continuously between each outlet nozzle and the manifold inlet, and further including a vertically extending header pipe, wherein the vertically extending header pipe is fluidly connected with the cavity, a sewage treatment water effluent tank, wherein the effluent tank extends below ground level below a frost line, wherein the vertically extending header pipe is fluidly connected to the effluent tank, wherein the manifold extends above ground level and the header pipe extends continuously vertically from the base to below ground level and to below the frost line, a pump, wherein the pump is fluidly connected to the effluent tank and the header pipe, wherein the pump is operative to pump water from the effluent tank to the sprayer base, a control circuit, wherein the control circuit is in operative connection with the pump, a perforated distribution container, wherein the perforated distribution container is below ground level and below the frost line, wherein the header pipe is fluidly connected with the perforated distribution container, a drain valve, wherein the drain valve positioned fluidly intermediate of the header pipe and the perforated distribution container, wherein the drain valve is selectively operable to fluidly connect and separate the header pipe and the perforated distribution container, wherein the control circuit is operative to control the pump to begin pumping water from the effluent tank toward the sprayer base at an initial low pressure and to increase the pressure to a final pressure to a final pressure and flow rate, and control the drain valve to fluidly separate the header and the perforated distribution container while the pump is being controlled to pump water toward the sprayer base, wherein the water discharging from the at least one outlet nozzle of the sprayer is operative to gradually continuously increase rotational speed of the manifold and the hub from a zero initial rotational speed to an operating rotational speed, and wherein the control circuit is further operative to control the pump to cease pumping water from the effluent tank towards the sprayer base, and cause the drain valve to place the header pipe in fluid connection with the perforated distribution container, wherein water within the manifold, the base and the header pipe is vertically drained through the header pipe to the perforated distribution container below the frost line.

28. The apparatus according to claim 1, and further comprising:

the manifold, wherein the at least one outlet nozzle is disposed from the axis a radial distance, wherein an outward extending annular deflector bell extends outwardly of each outlet nozzle, wherein the interior area is bounded by a lower manifold surface between the manifold inlet and each outlet nozzle, wherein when the axis extends vertically, each lower manifold surface is sloped downward continuously between each outlet nozzle and the manifold inlet, wherein the manifold includes an axially positioned port, wherein the port extends from outside the manifold to the manifold interior area, wherein the port is configured to releasibly receive a pressure indicator, and further including a vertically extending header pipe, wherein the vertically extending header pipe is fluidly connected with the cavity, a sewage treatment water effluent tank, wherein the effluent tank extends below ground level below a frost line, wherein the vertically extending header pipe is fluidly connected to the effluent tank, wherein the manifold extends above ground level and the header pipe extends continuously vertically from the base to below ground level and to below the frost line, a pump, wherein the pump is fluidly connected to the effluent tank and the header pipe, wherein the pump is operative to pump water from the effluent tank to the sprayer base, a control circuit, wherein the control circuit is in operative connection with the pump, a perforated distribution container, wherein the perforated distribution container is below ground level and below the frost line, wherein the header pipe is fluidly connected with the perforated distribution container, wherein the perforated distribution container includes a return water holding tank portion, a drain valve, wherein the drain valve positioned fluidly intermediate of the header pipe and the return water holding tank portion of the perforated distribution container, wherein the drain valve is selectively operable to fluidly connect and separate the header pipe and the return water holding tank portion of the perforated distribution container, wherein the control circuit is operative to control the pump to begin pumping water from the effluent tank toward the sprayer base at an initial low pressure and to increase the pressure to a final pressure and flow rate, control the drain valve to fluidly separate the header pipe and the perforated distribution container while the pump is being controlled to pump water toward the sprayer base, wherein the water discharging from the at least one outlet nozzle is operative to gradually continuously increase rotational speed of the manifold and the hub from a zero initial rotational speed to an operating rotational speed, and wherein the control circuit is further operative to control the pump to cease pumping water from the effluent tank towards the sprayer base, and cause the drain valve to place the header pipe in fluid connection with the drain water holding tank portion of the perforated distribution container, wherein water within the manifold, the base and the header pipe is vertically drained through the header pipe to the perforated distribution container below the frost line.

* * * * *